United States Patent
Dagan

(10) Patent No.: US 10,960,868 B2
(45) Date of Patent: *Mar. 30, 2021

(54) SYSTEMS AND METHODS FOR BRAKING A VEHICLE BASED ON A DETECTED OBJECT

(71) Applicant: MOBILEYE VISION TECHNOLOGIES LTD., Jerusalem (IL)

(72) Inventor: Erez Dagan, Tel Aviv (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 179 days.

This patent is subject to a terminal disclaimer.

(21) Appl. No.: 16/192,800

(22) Filed: Nov. 16, 2018

(65) Prior Publication Data

US 2019/0084549 A1    Mar. 21, 2019

Related U.S. Application Data

(60) Continuation of application No. 15/471,518, filed on Mar. 28, 2017, now Pat. No. 10,155,506, which is a
(Continued)

(51) Int. Cl.
*B60T 17/22* (2006.01)
*B60T 7/22* (2006.01)
(Continued)

(52) U.S. Cl.
CPC ............. *B60T 17/221* (2013.01); *B60T 7/22* (2013.01); *B60T 8/171* (2013.01); *B60T 8/172* (2013.01);
(Continued)

(58) Field of Classification Search
CPC ........ B60T 17/221; B60T 8/172; B60T 8/171; B60T 7/22; B60T 2270/40;
(Continued)

(56) References Cited

U.S. PATENT DOCUMENTS

| 5,559,695 A | 9/1996 | Daily |
| 7,113,867 B1 | 9/2006 | Stein |

(Continued)

FOREIGN PATENT DOCUMENTS

| CN | 102685516 A | 9/2012 |
| CN | 103359119 A | 2/2013 |
| WO | WO 2013/107525 | 7/2013 |

OTHER PUBLICATIONS

XP055660584, "Availability, Reliability, SIL," Retrieved from the Internet: URL:https://web.archive.org/web/20120710031115/http://www.mtl-inst.com/images/uploads/datasheets/App_Notes/AN9030.pdf (retrieved on Jan. 22, 2020).
(Continued)

*Primary Examiner* — Yuen Wong
(74) *Attorney, Agent, or Firm* — Finnegan, Henderson, Farabow, Garrett & Dunner, LLP

(57) ABSTRACT

Systems and methods are provided for detecting an object and causing a vehicle to brake based on the detection. In one implementation, an object detecting and braking system for a vehicle includes at least one image capture device configured to acquire a plurality of images of an area including an object in front of the vehicle. The system includes at least one processing device programmed to perform a first image analysis to determine a first estimated time-to-collision of the vehicle with the object, and to perform a second image analysis to determine a second estimated time-to-collision of the vehicle with the object. The processing device is also programmed to calculate a difference between the first estimated time-to-collision and the second estimated time-to-collision, to determine that the difference does not exceed a predetermined threshold, and to cause the vehicle to brake based on the determination that the difference does not exceed the predetermined threshold.

19 Claims, 34 Drawing Sheets

Related U.S. Application Data division of application No. 14/720,187, filed on May 22, 2015, now Pat. No. 9,650,025.

(60) Provisional application No. 62/001,772, filed on May 22, 2014.

(51) Int. Cl.
    *B60T 8/171*     (2006.01)
    *B60T 8/172*     (2006.01)
    *G06T 7/269*     (2017.01)
    *G07C 5/08*     (2006.01)

(52) U.S. Cl.
CPC ............ *G06T 7/269* (2017.01); *G07C 5/0808* (2013.01); *B60T 2201/022* (2013.01); *B60T 2270/40* (2013.01); *G06T 2207/30252* (2013.01); *G06T 2207/30261* (2013.01)

(58) Field of Classification Search
CPC . B60T 2201/022; G07C 5/0808; G06T 7/269; G06T 2207/30261; G06T 2207/30252; G06K 9/00805; G06K 9/00791
See application file for complete search history.

(56) References Cited

U.S. PATENT DOCUMENTS

| | | |
|---|---|---|
| 2005/0196034 A1 | 9/2005 | Hattori et al. |
| 2006/0178830 A1 | 8/2006 | Sherony |
| 2008/0046181 A1 | 2/2008 | Koike et al. |
| 2010/0013615 A1* | 1/2010 | Hebert .................. B60Q 9/006 340/425.5 |
| 2012/0314071 A1 | 12/2012 | Rosenbaum et al. |

OTHER PUBLICATIONS

Extended Search Report dated Feb. 7, 2020 issued from the European Patent Office in Application No. 19213374.2-1210 (13 pages).
Communication relating to the results of the partial international search included in an Invitation to Pay Additional Fees dated Nov. 20, 2015, in corresponding international application No. PCT/IB2015/001457, filed May 22, 2015 (6 pages).
International Search Report and Written Opinion issued in International Application No. PCT/IB2015/001457, dated Feb. 17, 2016.
Kyung-Ho Shin et al. "A study on the reliability improvement for applying GNSS to railroad system" 8$^{th}$ World Congress on Railway Research, May 18-22, 2008, pp. 1-7, retrieved on Nov. 11, 2015 from the Internet at URL: https://web.archive.org/web/2010112504161 /http:www.uic.org/cdrom/2008/11_wcrr2008/pdf/0.1.4.5.3.pdf(7 pages).
First Office Action issued from the State Intellectual Property Office (SIPO) in Chinese Application No. 201580040400.8, dated Aug. 6, 2018, and its English Translation Thereof (12 pages).
Research on Diagnosis Method of Bearing Fault Degree Based on Texture Feature Recognition of Vibration Image, Guan Zhenzhen, et al.., Vibration and Shock, Issue 5 of 2013, pp. 127-131.
First Office Action, dated Jan. 5, 2021, issued by China National Intellectual Property Administration in a corresponding Chinese Application No. 201910475261.1 and an English Translation thereof.

* cited by examiner

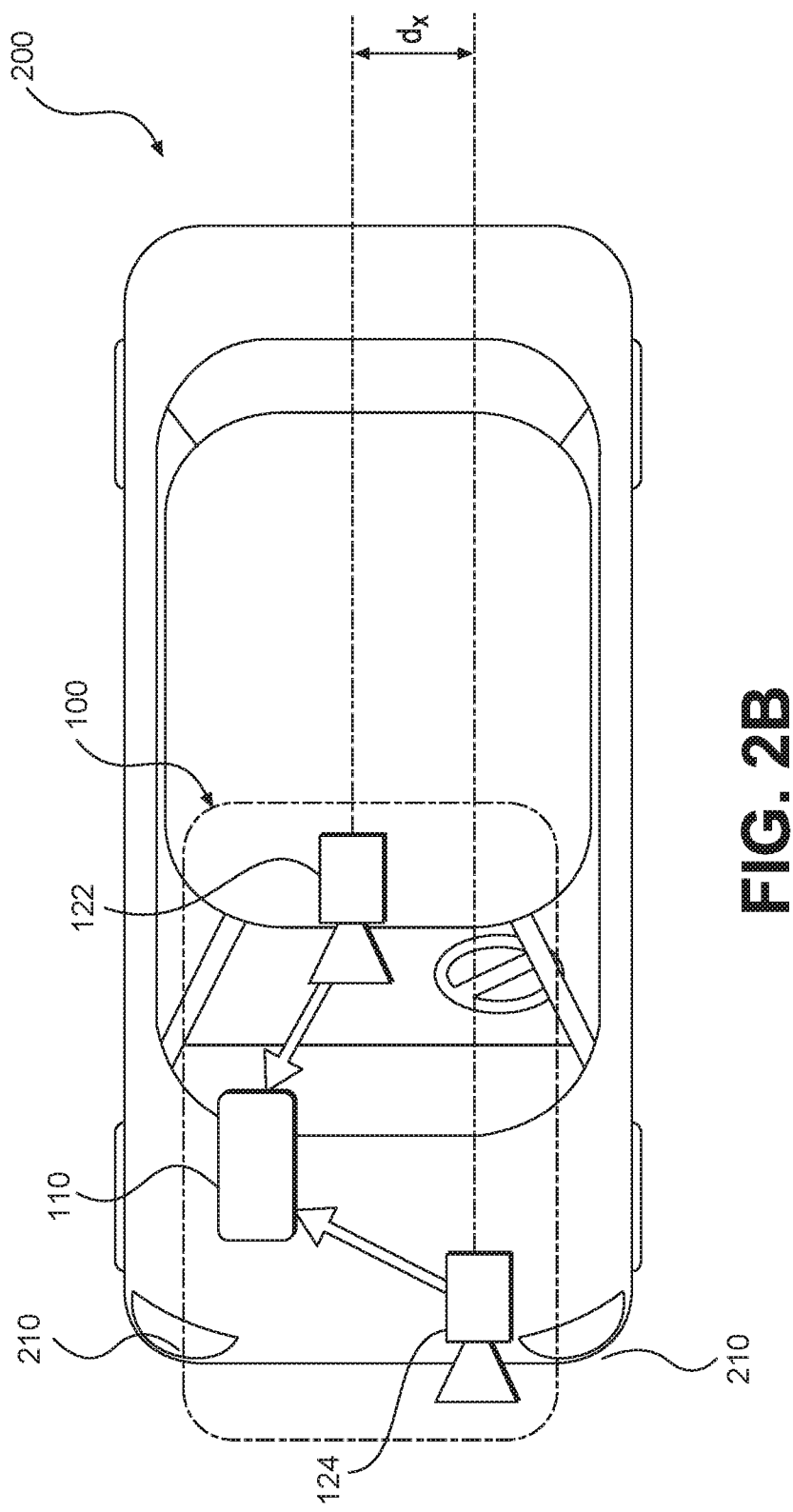

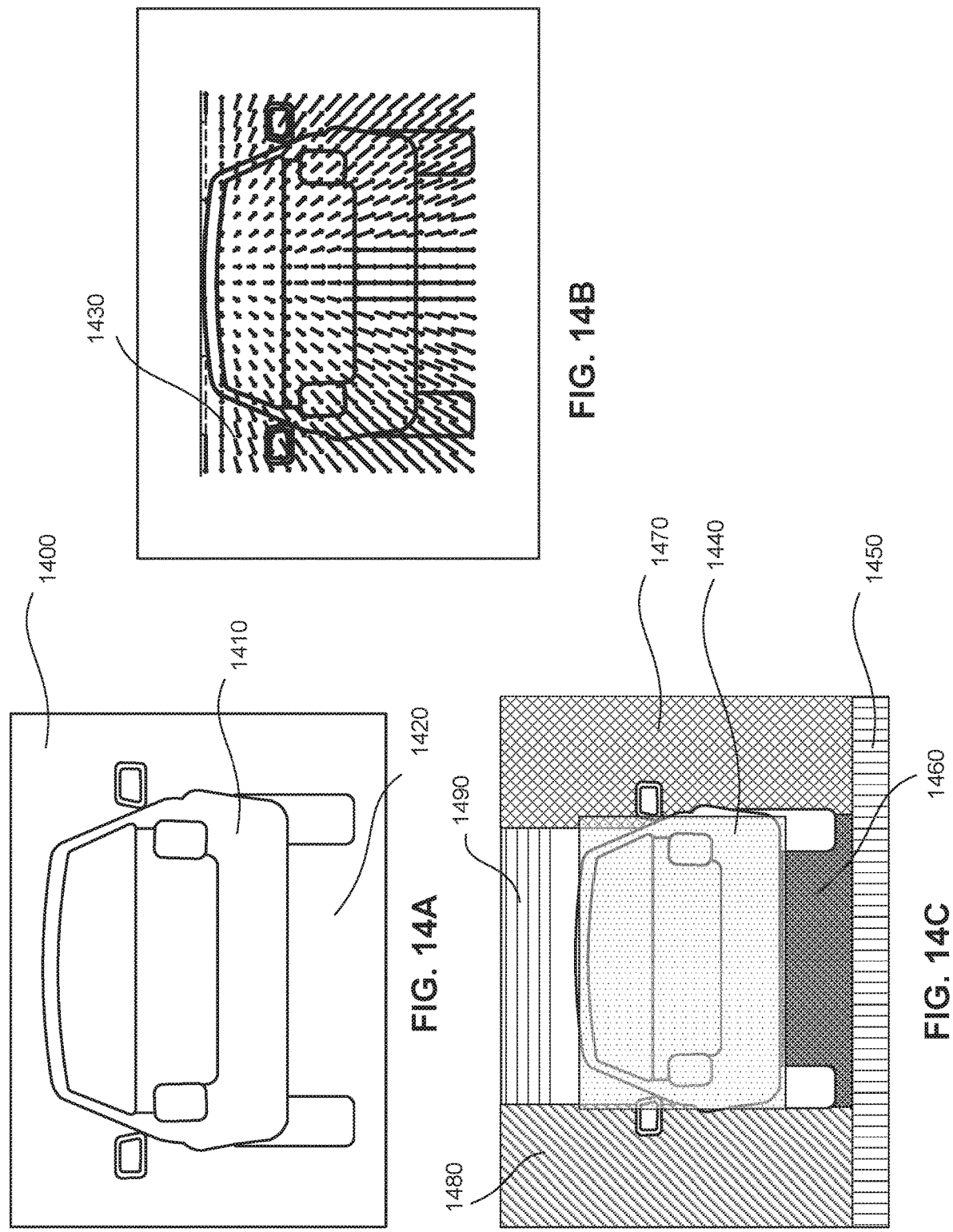

SYSTEMS AND METHODS FOR BRAKING A VEHICLE BASED ON A DETECTED OBJECT

CROSS-REFERENCE TO RELATED APPLICATIONS

This is a of Application is a continuation of application Ser. No. 15/471,518, filed Mar. 28, 2017, which is a division of application Ser. No. 14/720,187, filed May 22, 2015 (now U.S. Pat. No. 9,650,025) and claims the benefit of U.S. Provisional Patent Application No. 62/001,772, filed May 22, 2014. The foregoing applications are incorporated herein by reference in their entirety.

BACKGROUND

I. Technical Field

The present disclosure relates generally to autonomous vehicle navigation and, more specifically, to systems and methods that use cameras to detect sit object in front of the vehicle and that apply brakes based on the detected object.

II. Background Information

As technology continues to advance, the goal of a fully autonomous vehicle that is capable of navigating on roadways is on the horizon. Primarily, an autonomous vehicle may be able to identify its environment and navigate without input from a human operator. Autonomous vehicles may also take into account a variety of factors and make appropriate decisions based on those factors to safely and accurately reach an intended destination. For example, various objects—such as other vehicles and pedestrians—are encountered when a vehicle typically travels a roadway. Autonomous driving systems may recognize these objects in a vehicle's environment and take appropriate and timely action to avoid collisions. Additionally, autonomous driving systems may identify other indicators—such as traffic signals, traffic signs, and lane markings—that regulate vehicle movement (e.g., when the vehicle must stop and may go, a speed at which the vehicle must not exceed, where the vehicle must be positioned on the roadway, etc.). Autonomous driving systems may need to determine when a vehicle should change lanes, turn at intersections, change roadways, etc. As is evident from these examples, many factors may need to be addressed in order to provide an autonomous vehicle that is capable of navigating safely and accurately.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include, one, two, or more cameras that monitor the environment of a vehicle and cause a navigational response based on an analysis of images captured by one or more of the cameras.

Consistent with a disclosed embodiment, an object detecting and braking system for a vehicle is provided. The system may include at least one image capture device configured to acquire a plurality of images of an area including an object in front of the vehicle. The system may include a data interface. The system may include at least one processing device programmed to receive the plurality of images via the data interface, perform a first image analysis based on at least a first image and a second image to determine a first estimated time-to-collision of the vehicle with the object, and perform a second image analysis based on act least a third image and a fourth image to determine a second estimated time-to-collision of the vehicle with the object. The processing device may be programmed to calculate a difference between the first estimated time-to-collision and the second estimated time-to-collision, determine that the difference does not exceed a predetermined threshold, and cause the vehicle to brake based on the determination that the difference does not exceed the predetermined threshold.

Consistent with another disclosed embodiment, a vehicle is provided. The vehicle may include a body. The vehicle may include at least one image capture device configured to acquire a plurality of images of an area including an object in front of the vehicle. The system may include a data interface. The system may include at least one processing device programmed to receive the plurality of images via the data interface, perform a first image analysis based on at least a first image and a second image to determine a first estimated time-to-collision of the vehicle with the object, and perform a second image analysis based on at least a third image and a fourth image to determine a second estimated time-to-collision of the vehicle with the object. The processing device may be programmed to calculate a difference between the first estimated time-to-collision and the second estimated time-to-collision, determine that the difference does not exceed a predetermined threshold, and cause the vehicle to brake based on the determination that the difference does not exceed the predetermined threshold.

Consistent with yet another disclosed embodiment, a method for detecting an object and braking a vehicle is provided. The method may include acquiring, via at least one image capture device, a plurality of images of an area including an object in front of the vehicle. The method may include receiving, via a processing device, the plurality of images, performing, via the processing device, a first image analysis based on at least a first image and a second image to determine a first estimated time-to-collision of the vehicle with the object, and performing via the processing device, a second image analysis based on at least a third image and a fourth image to determine a second estimated time-to-collision of the vehicle with the object. The method may include calculating, via the processing device, a difference between the first estimated time-to-collision and the second estimated time-to-collision, determining, via the processing device, that the difference does not exceed a predetermined threshold, and causing, via the processing device, the vehicle to brake based on the determination that the difference does not exceed the predetermined threshold.

Consistent with another disclosed embodiment, a method is provided for assessing an overall system fail re rate associated with a braking decisioning system for a vehicle. The method includes determining, using a processing device, a first failure rate associated with a textural analysis based sub-system. The textural analysis based sub-system is configured to make a decision to brake based on a change in texture between at least to images of an area in front of a vehicle. The method further includes determining, using the processing device, a second failure rate associated with a structural analysis based sub-system. The structural analysis based sub-system is configured to make a decision to brake based on optical flow information derived from at least two images of the area in front of the vehicle. The method also includes determining, using the processing device, the overall system failure rate based on the first failure rate and the second failure rate.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2B is a diagrammatic top view representation of the vehicle and system shown in FIG. 2A consistent with the disclosed embodiments.

FIGS. 14A-14C show an image with an optical flow field and a distribution of a second estimated time-to-collision in the flow field consistent with the disclosed embodiments.

DETAILED DESCRIPTION

Figure 1:
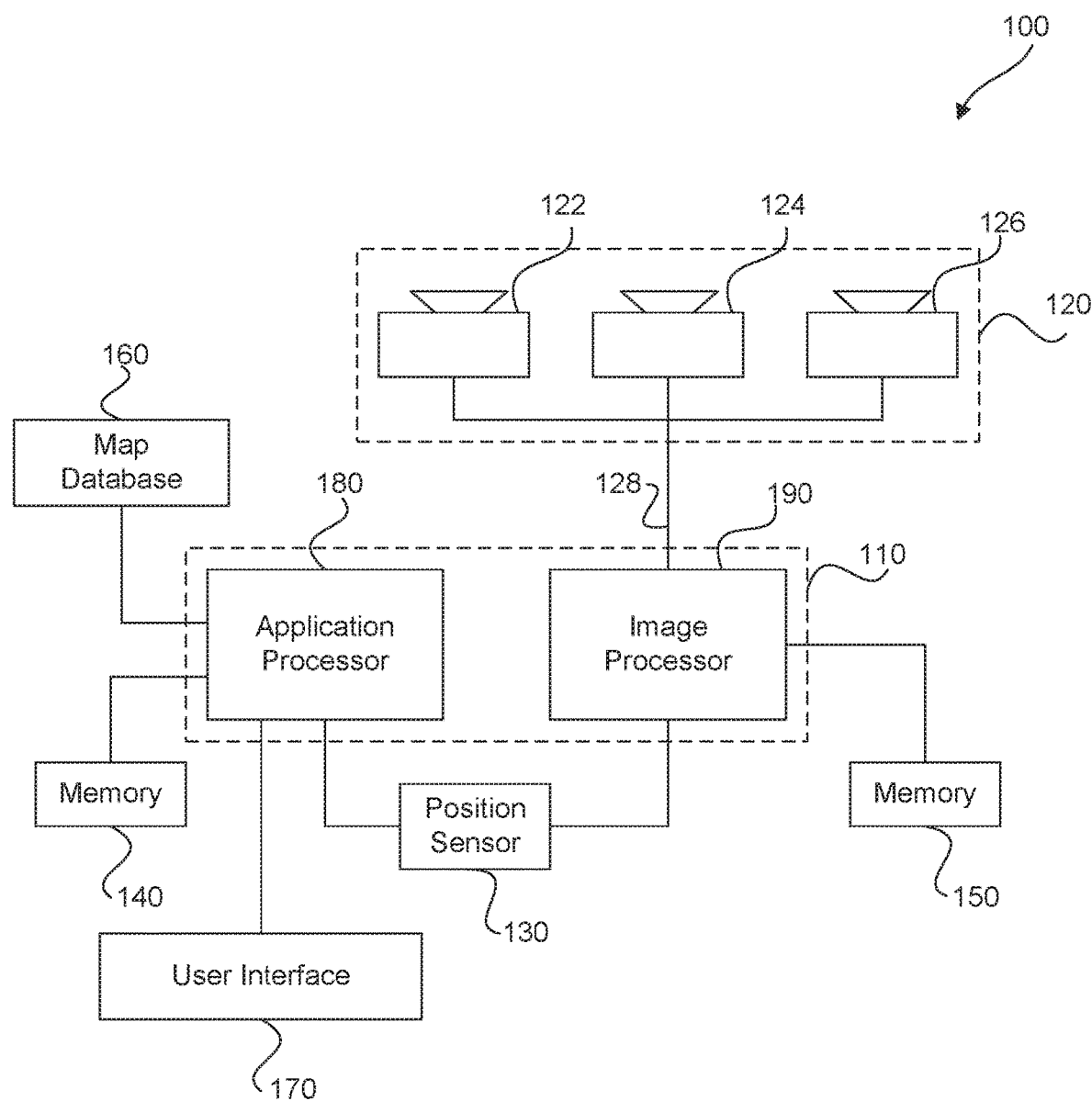
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiment processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g. x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 3.32 Mhz. The EyeQ2® architecture consists of two floating point, hyper-thread 32-bit RISC CPUs (MIPS32® 34K® cores), five Vision Computing Engines (VCE), three Vector Microcode Processors (VW®), Denali 64-bit Mobile DDR Controller, 128-bit internal Sonics Interconnect, dual 16-bit Video input and 18 bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers of microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be irate gated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or habilitation, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including for example, names associated with an of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
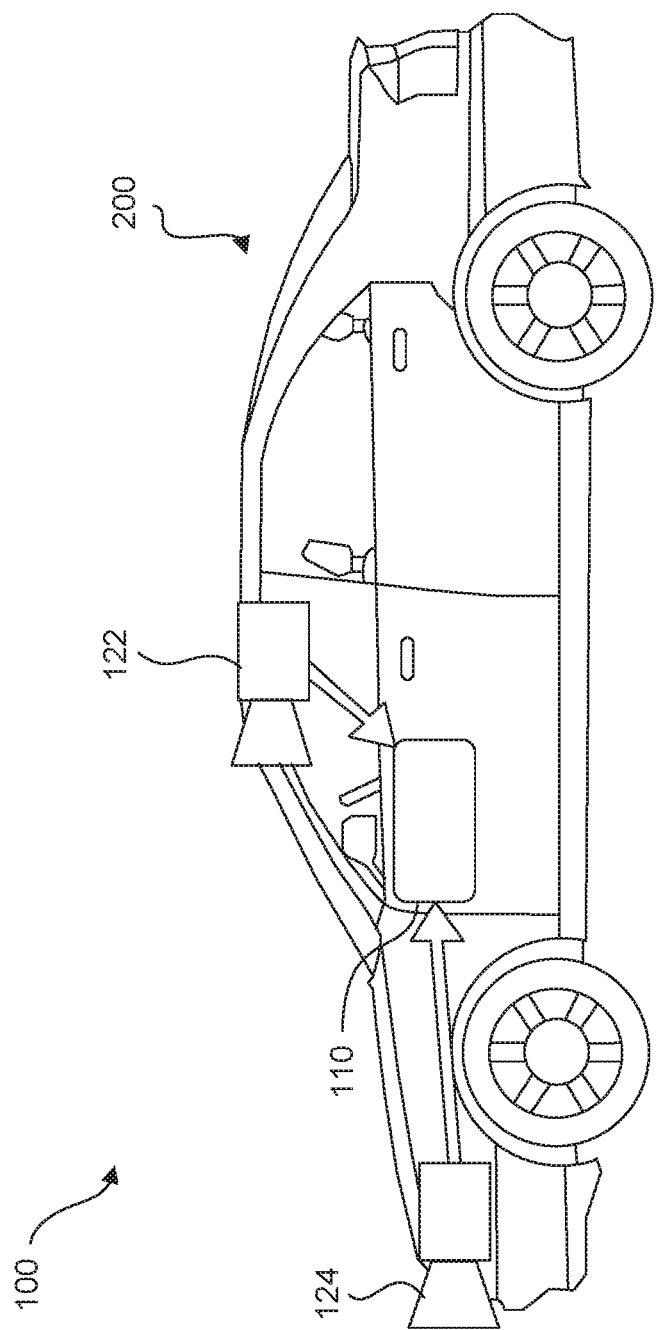
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
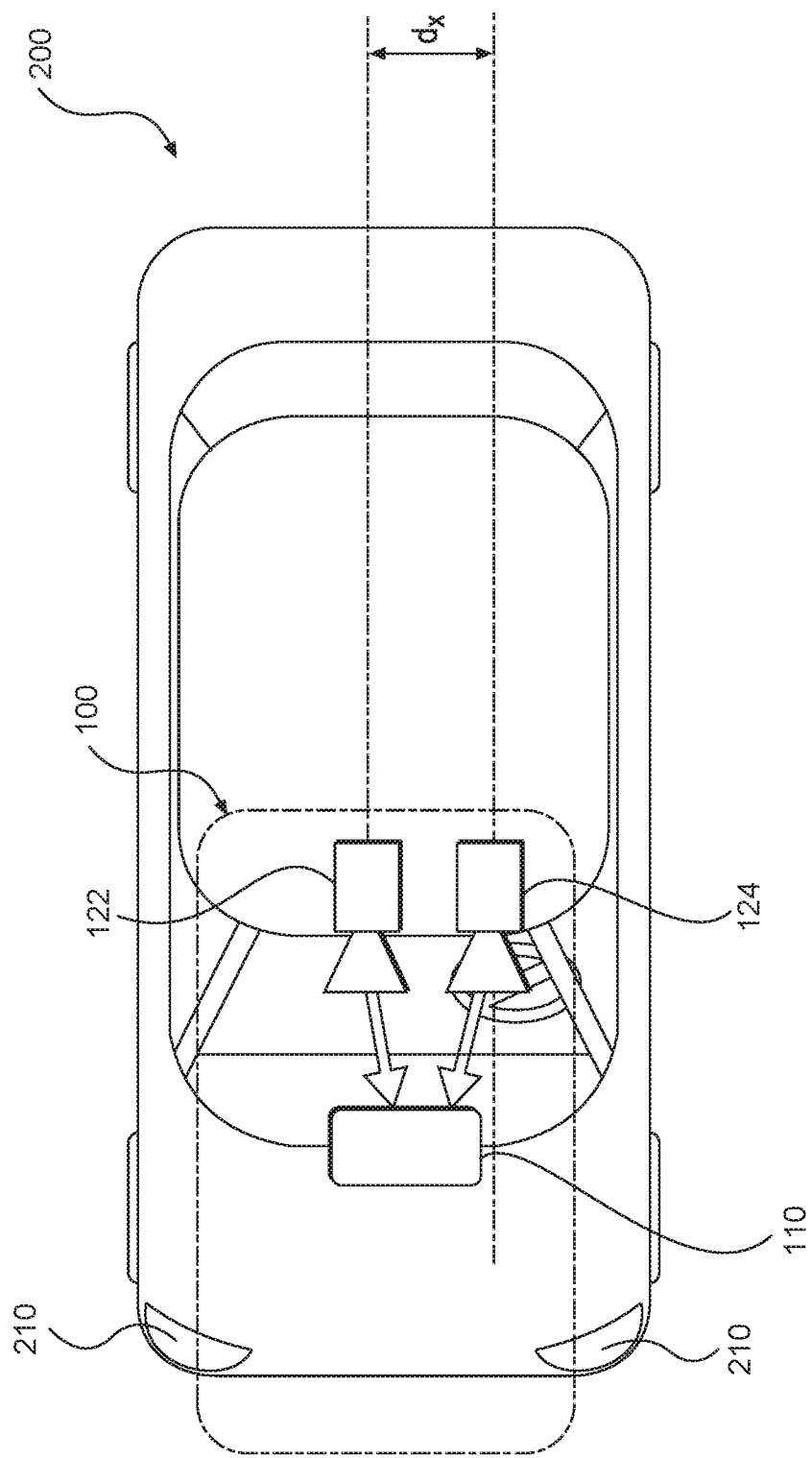
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
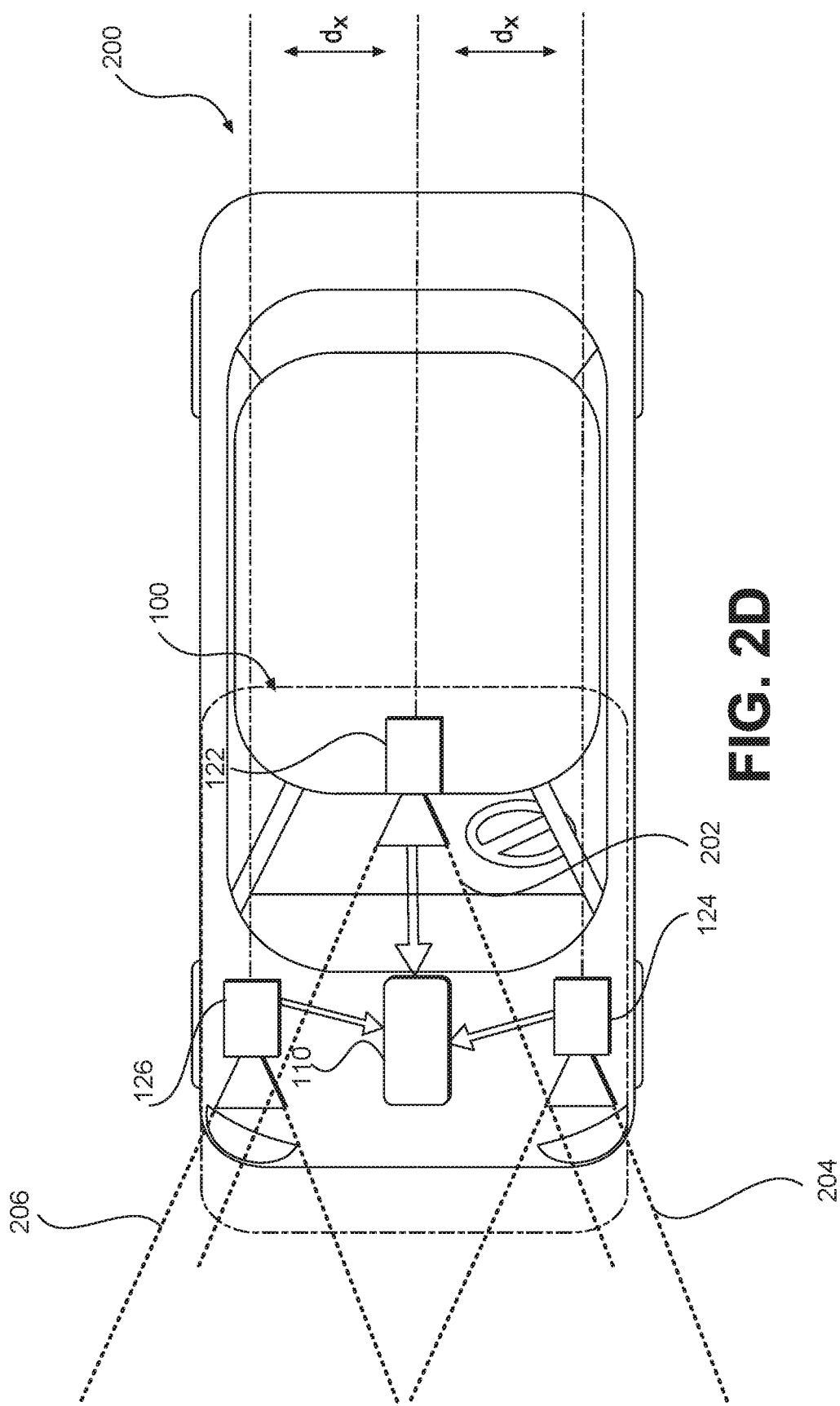
FIG. 2D is a diagrammatic top view representation of yet another embodiment of vehicle including a system consistent with the disclosed embodiments.
Figure 2E:
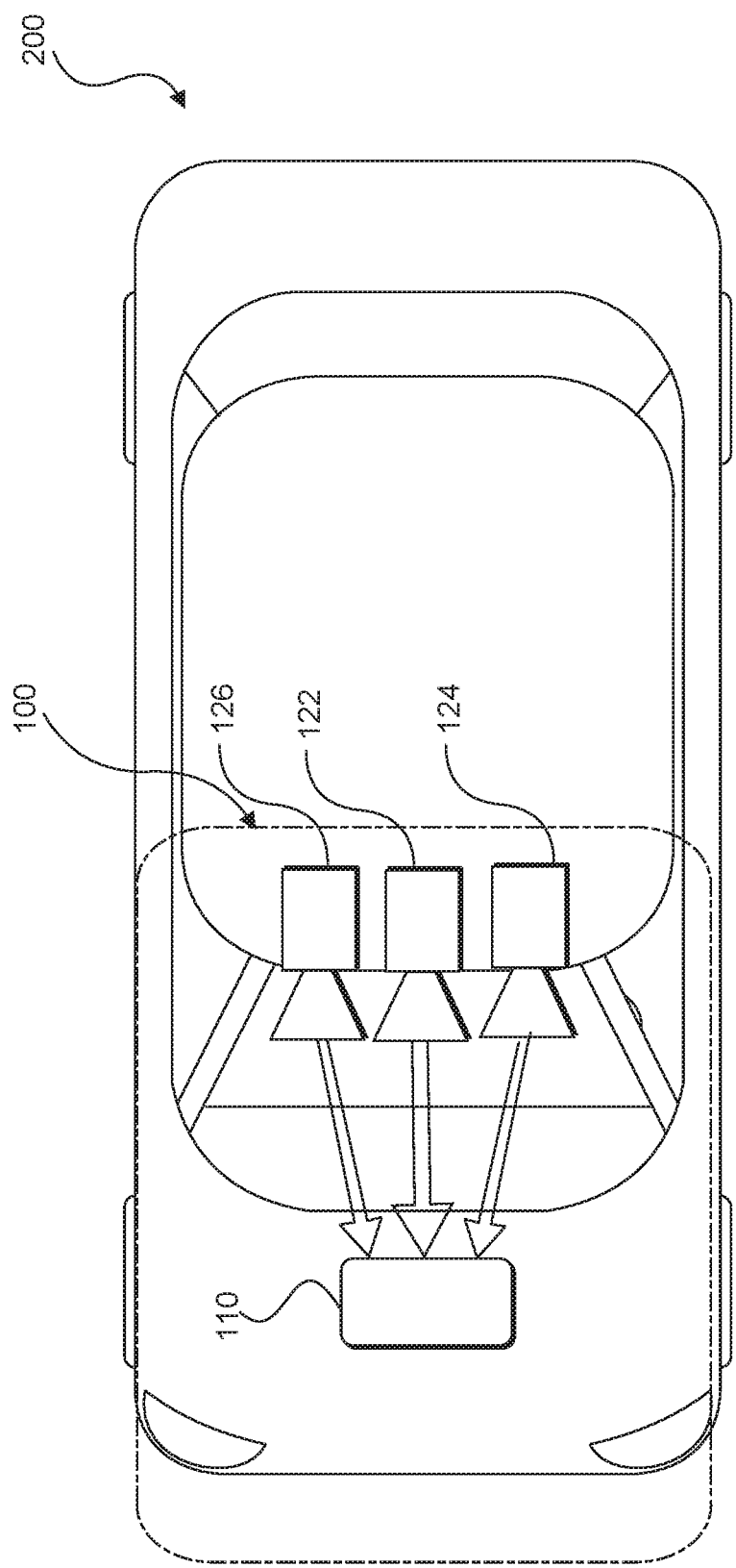
FIG. 2E is a diagrammatic top view representation of yet another embodiment a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of mage capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements, in son e embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels, image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative Heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s)

associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before, or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they, may include cameras having different fields of view (FOV) and focal lengths. The fields of view of image capture de ices 122, 124, and 127 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-tip objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments the fields of view of image capture devices 122, 124, and 126 may be aligned such that a center of the narrower FOV image capture devices 124 and/or 126 may be located in a lower half of the field of view of the wider FOV device 122.

Figure 2F:
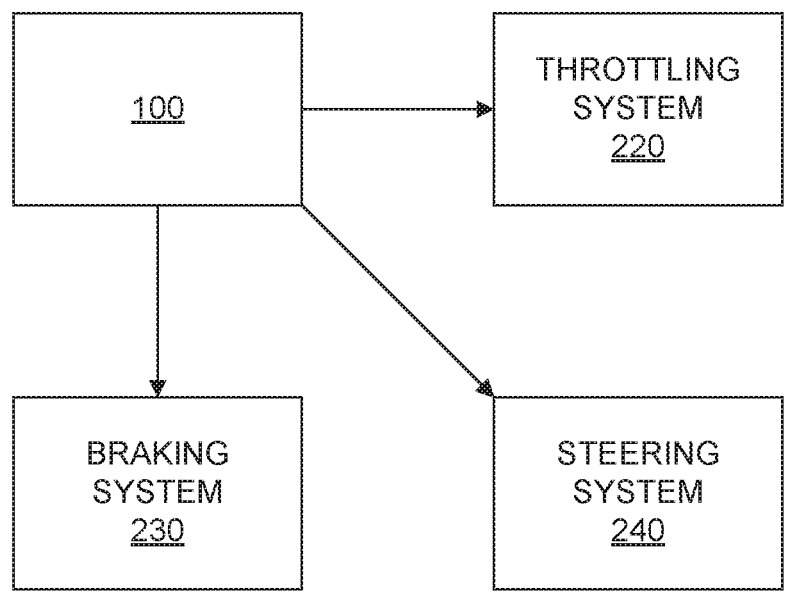
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
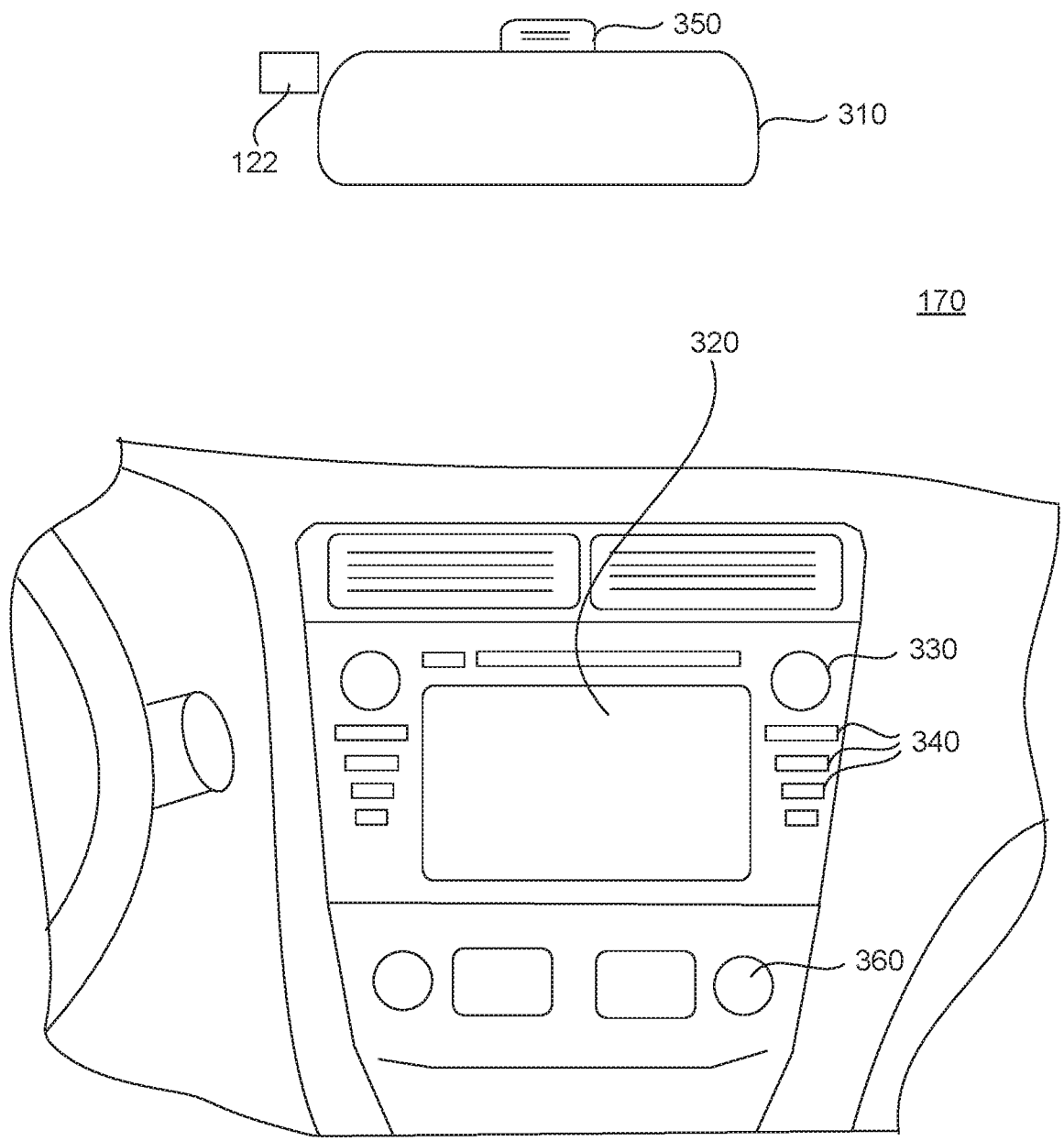
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide carious notifications (e.g., alerts) via speakers 360.

Figure 3B:
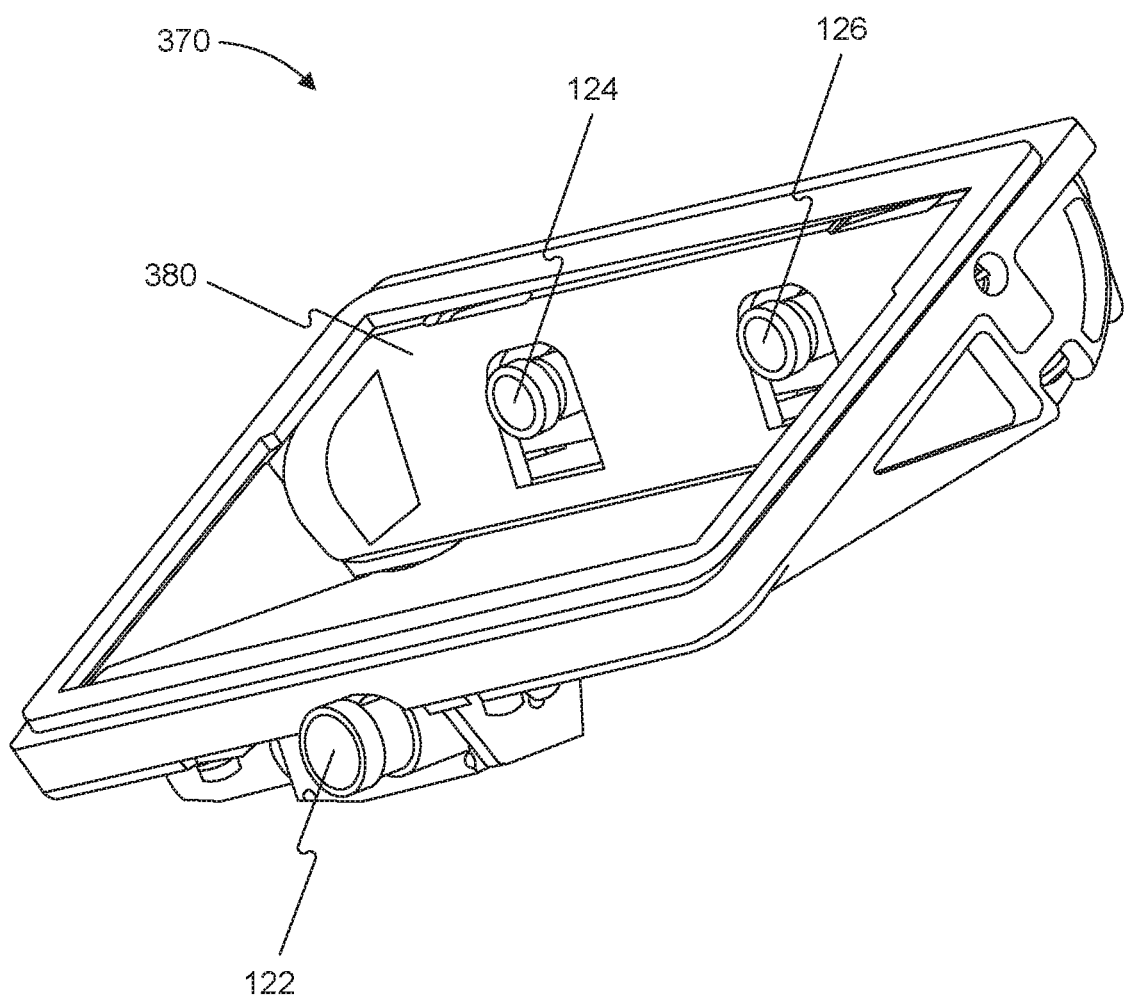
FIG. 3B is an illustration of an example of a camera mount that is configured to be positioned behind a rearview mirror and against a vehicle windshield consistent with the disclosed embodiments.
Figure 3C:
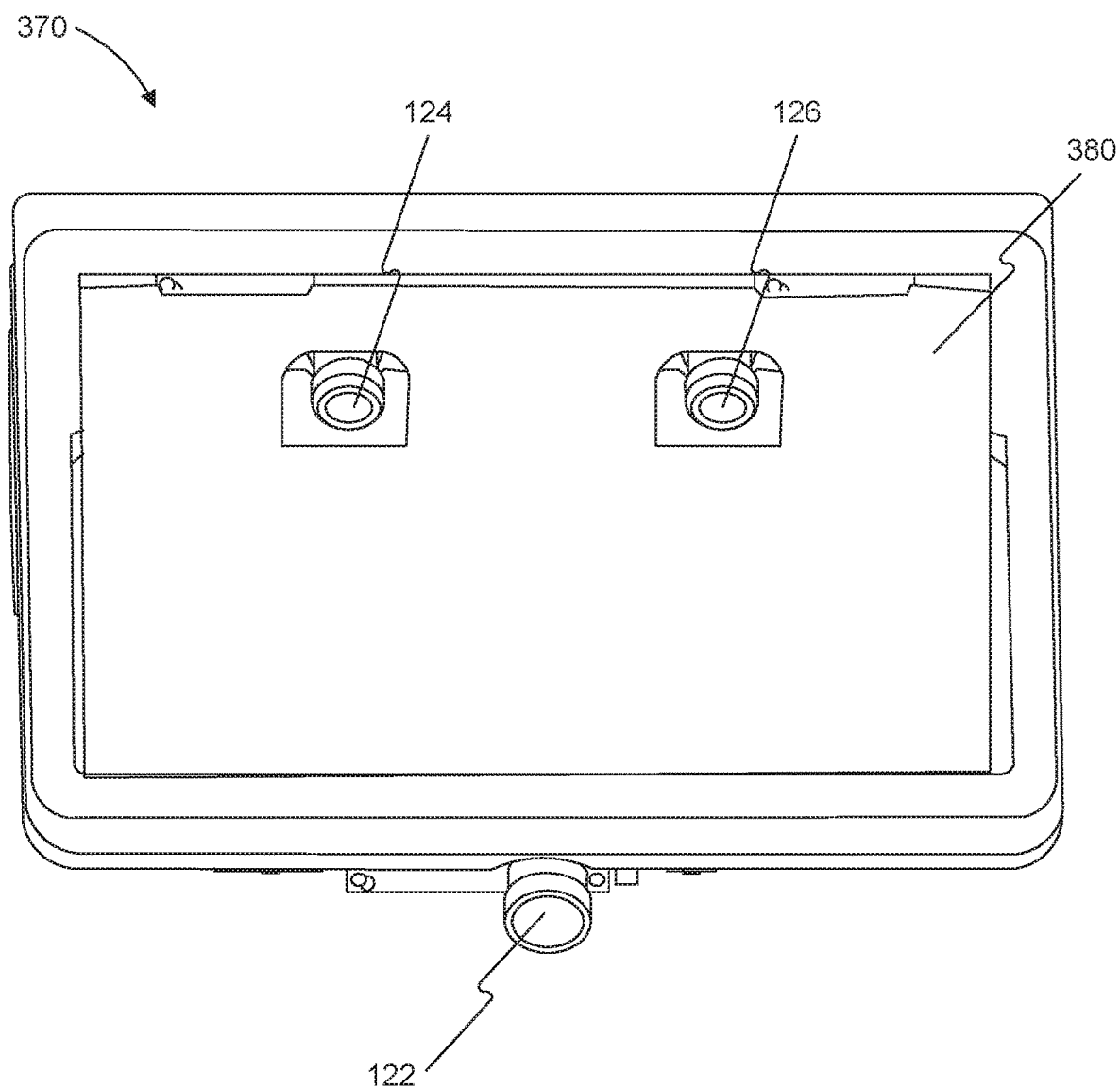
FIG. 3C is an illustration of the camera mount shown in FIG. 3B from a different perspective consistent with the disclosed embodiments.
Figure 3D:
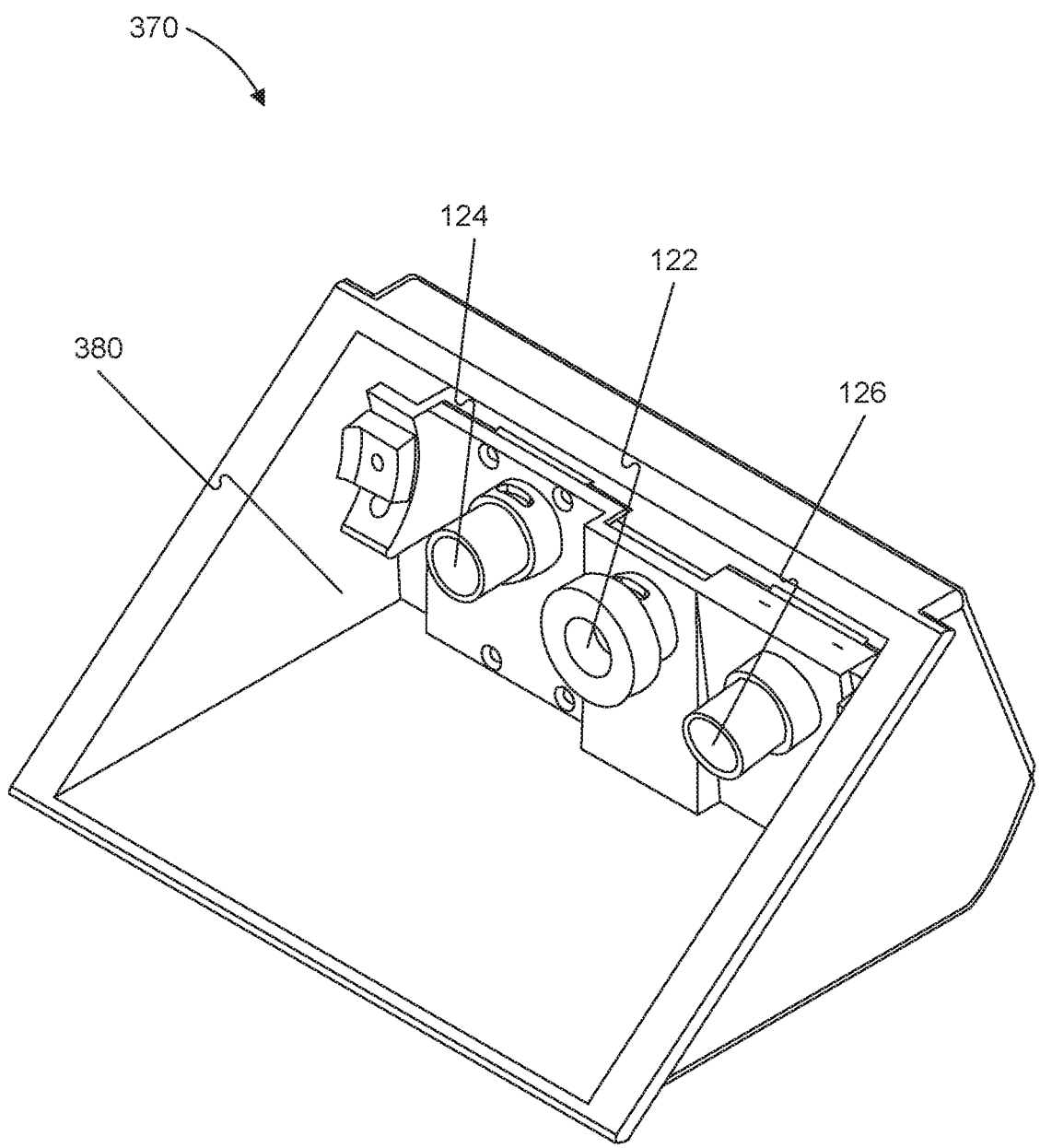
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 320, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example system 100 may use a two-camera imaging system, where first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 50 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing, device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other load objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive ages from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant subsystem for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
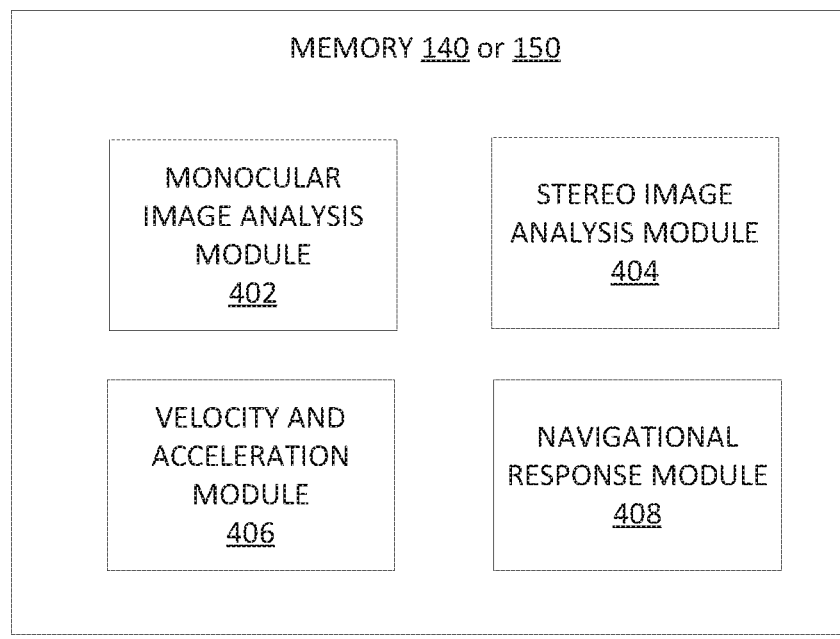
FIG. 4 is an exemplary block diagram of a memory configured to store instructions for performing one or more operations consistent with the disclosed embodiments.

FIG. 4 is an exemplary functional block diagram of memory 140 and/or 150, which may be stored, programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any pa ocular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of in acquired by a combination of image capture devices selected from any of image capture devices 122, 124, and 126. In some embodiments, processing, unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing, unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
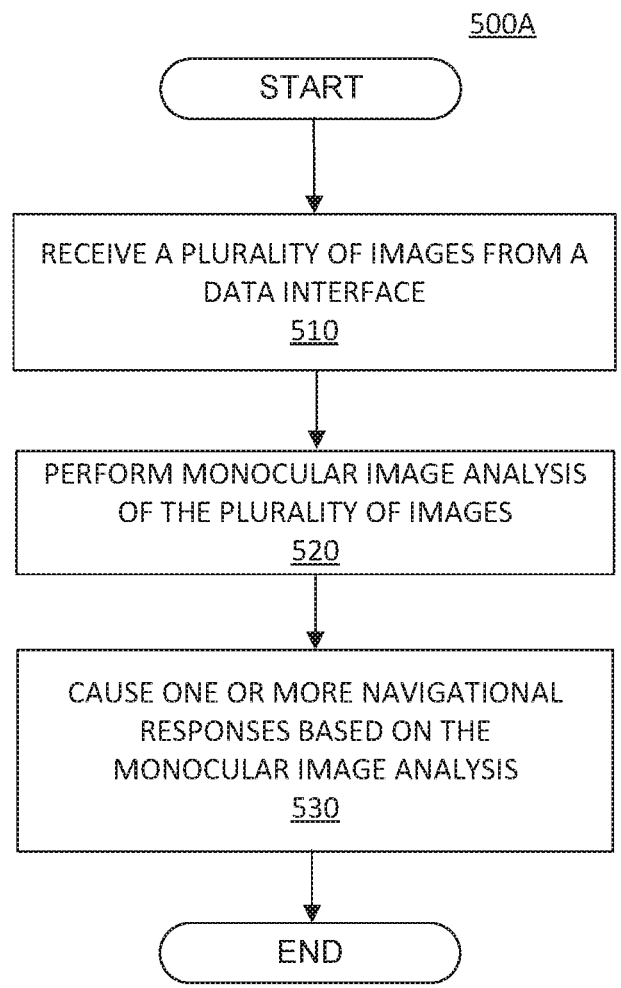
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based of monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above is connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
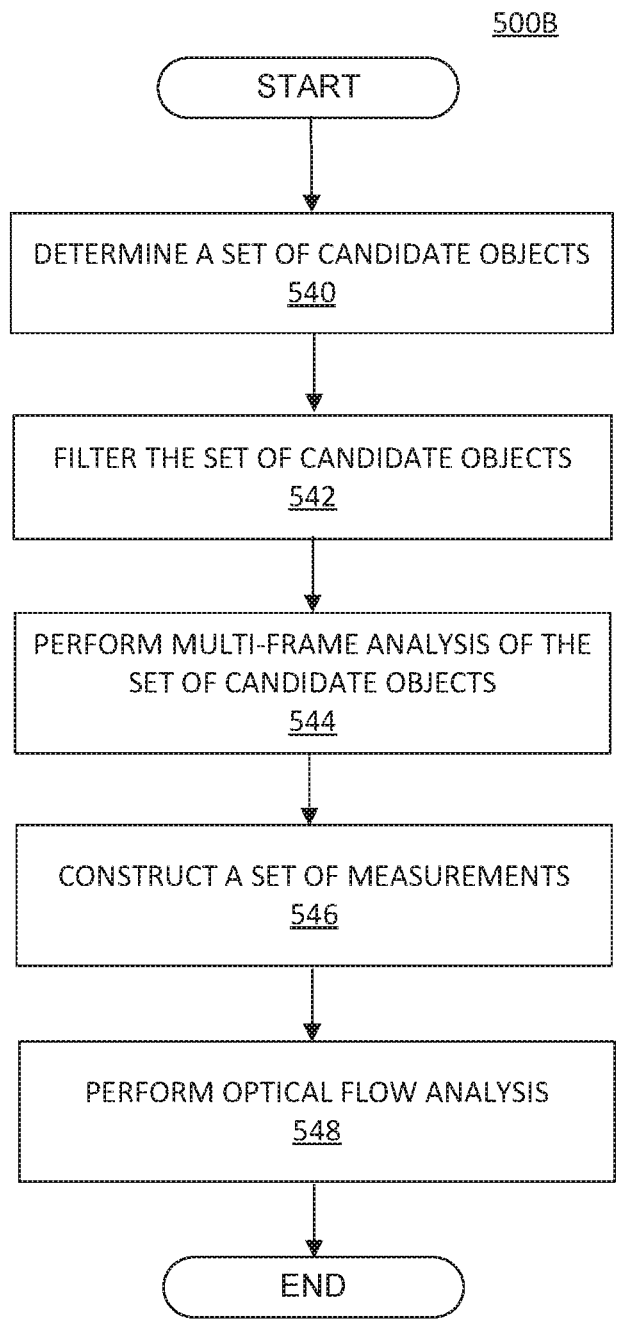
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses," For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of a object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
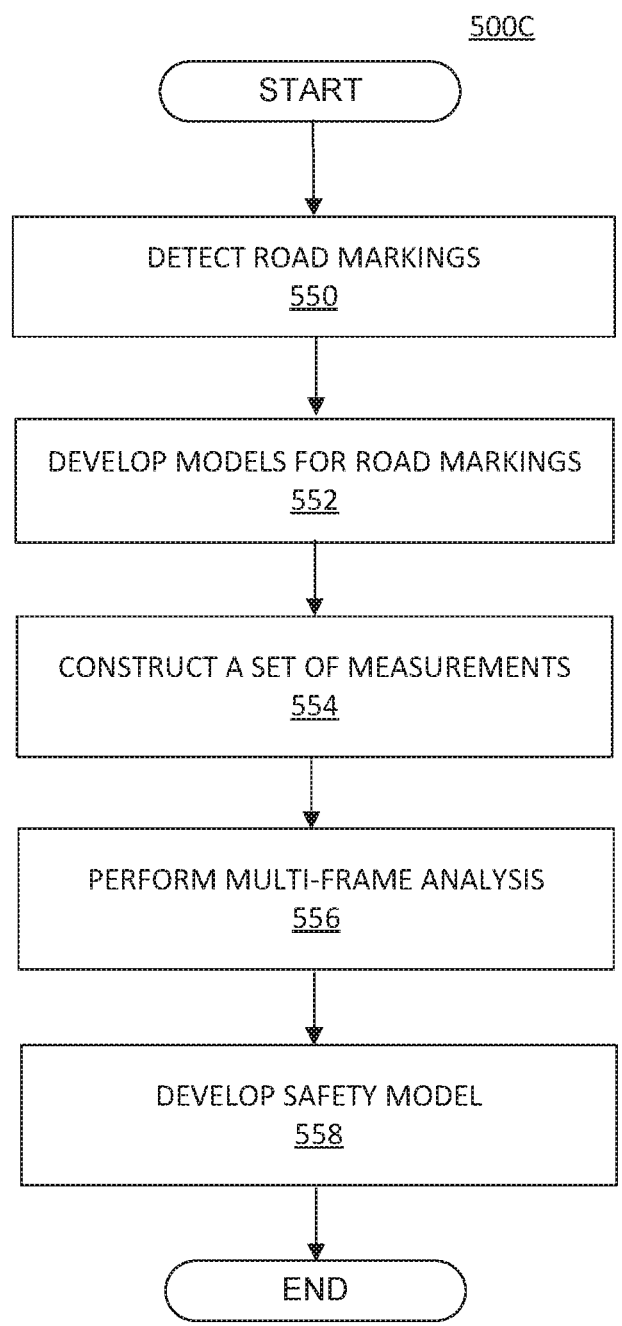
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in they road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To de lop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
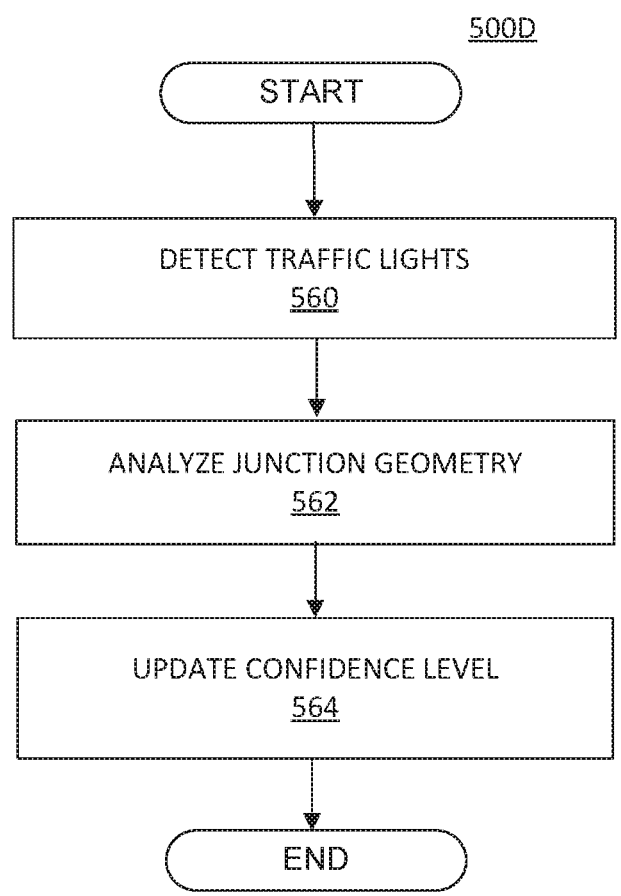
FIG. 5D is a flowchart showing an exemplary process for detecting traffic lights sir a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By perform steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
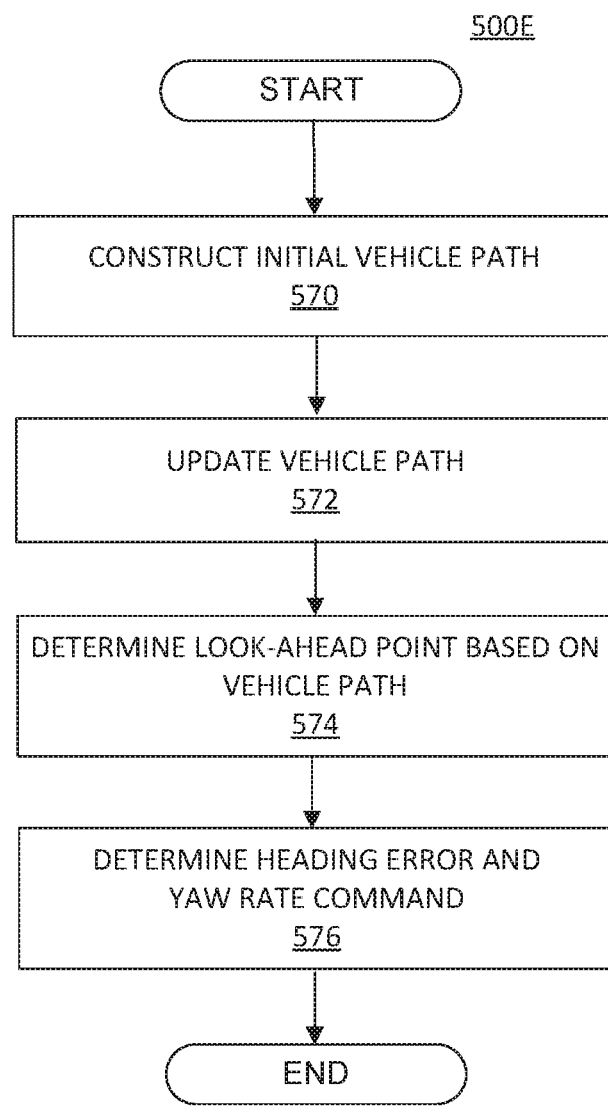
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance d described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200 such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain: The high-level control gait may be equal to: (2/look-ahead time), if the look-ahead distance is not at the lower bound. Otherwise, the high-level control gain may be equal to: (2*speed of vehicle 200/look-ahead distance).

Figure 5F:
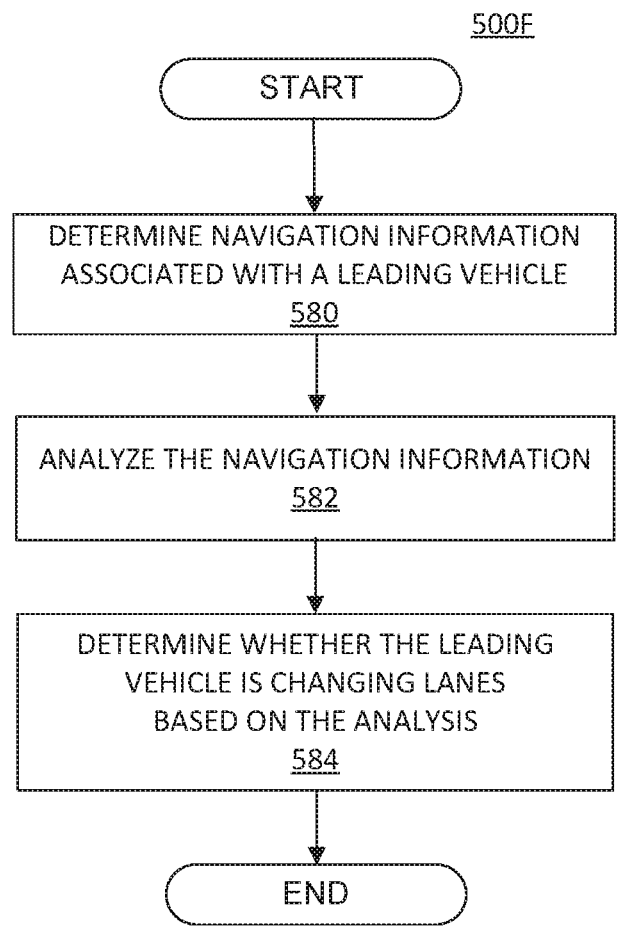
FIG. 5F is a flowchart showing an exemplary process for determining whether a leading vehicle is changing laves consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), acid/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta x^2)/2(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
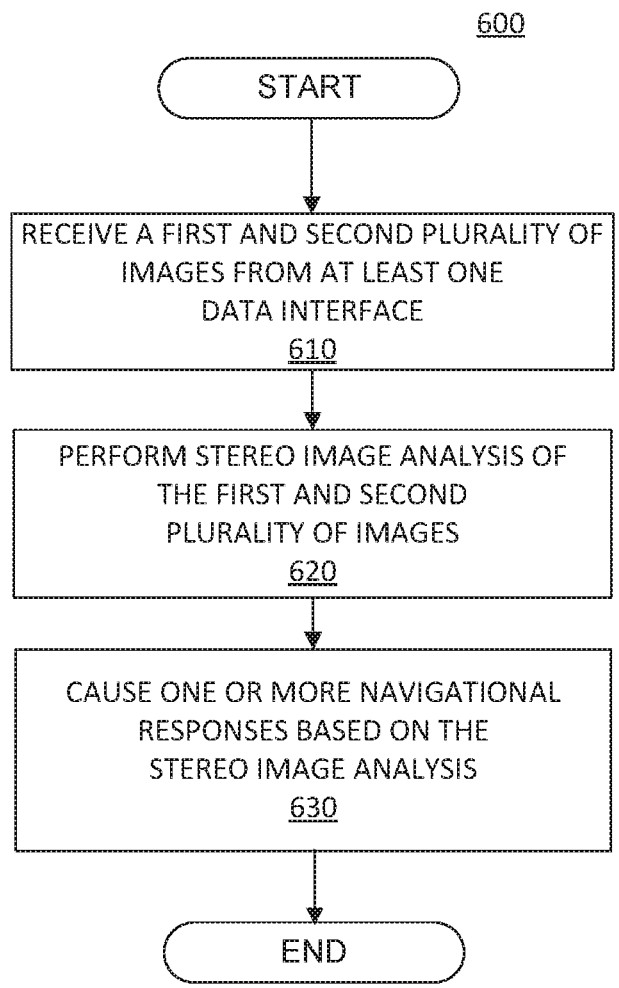
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images is data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like, Stereo image analysis may be performed in a manner similar to the steps described in connection with FIGS. 5A-5D above. For example, processing unit 110 may execute stereo ii age analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may, analyze the differences in pixel-level data for other data subsets from among the two streams of captured images, for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like, in some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
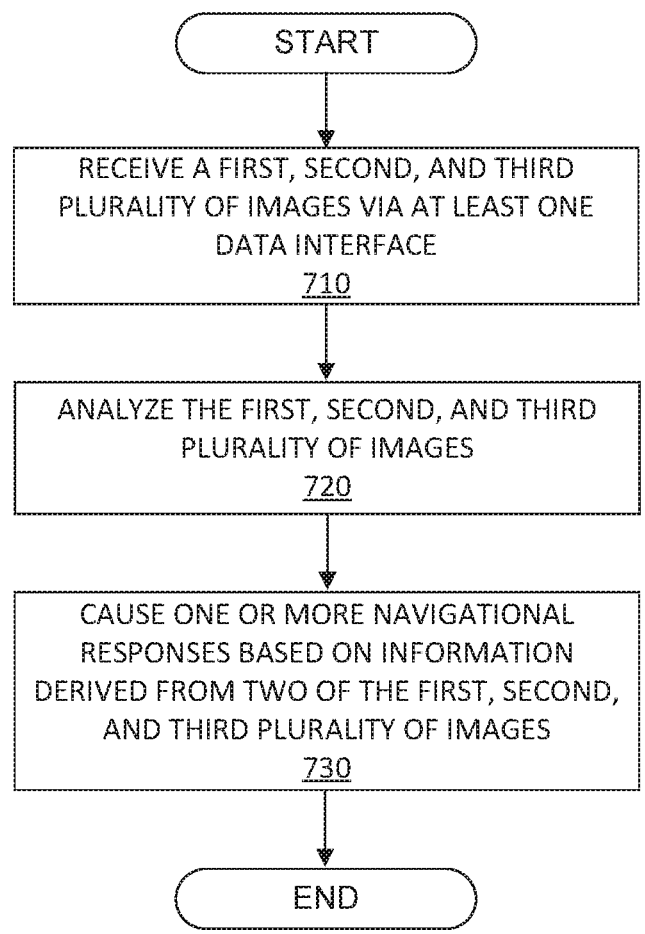
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first second, and third plurality of images via data interface 128. For instance, cameras included in image acquisition unit 120 (such as image capture devices 122, 124, and 126 having fields of view 202, 204, and 206) may capture a first, second, and third plurality of images of an area for yard and/or to the side of vehicle 200 and transmit them over a digital connection (e.g., USB, wireless, Bluetooth etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126 including their respective locations and fields of view 202, 204, and 206 may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments processing unit 110 may select information derived from two of the first, second, and third plurality of images by determining the extent to which information derived from one image source is consistent information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Object Detecting and Braking System

In some embodiments, vehicle 200 may include an object detecting and braking system configured to detect an object in front of vehicle 200 and cause vehicle 200 to brake, e.g., using braking system 230, based on the detection of the object. For example, the object detecting and braking system may cause vehicle 200 to brake automatically, or autonomously, without or with limited driver intervention. The automatic or autonomous object detecting and braking system may or may not alloy a driver to intervene to take over control of braking system 230.

The object detecting and braking system may include a plurality of other systems discussed above. For example, the object detecting and braking system may include system 100, braking system 230, and one or more of image capture devices 122, 124, and 126. The one or more of image capture devices 122, 124, and 126 may acquire one or more images of an environment or an area in front of vehicle 200. Which may include an object, such as another vehicle, a pedestrian, a road surface, etc. Processing unit 110 may process the images based on at least two independent analyses to determine at least two times-to-collision (TTCs) of vehicle 200 with the object, in some embodiments, the two TTCs of vehicle 200 with the object may be determined separately and independently of each other. A "time-to-collision" (TTC) may also be referred to as a "time-to-contact." The time-to-collision is an estimated time that would lapse before vehicle 200 collides with another object. Processing unit 110 may determine that a difference between the two times-to-collision does not exceed a predetermined threshold. Based on this determination, processing unit 110 may cause vehicle 200 to brake using, e.g., braking system 230. The automatic or autonomous braking may assist the driver to avoid collision with the object in front of vehicle 200, thereby improving driving safety. By causing vehicle 200 to brake when the difference between the two TTCs does not exceed the predetermined threshold, false braking may be prevented or reduced.

Some embodiments, the object detecting and braking system may use two independent channels of information inherent to monocular video sensing. The first channel of information may be referred to as a "texture" or "appearance information" channel. System 100 may perform an analysis based on the texture or appearance information. In this channel, system 100 may perform pattern recognition over the pixels intensities in each image separately among different images (e.g., two sequential images or frames). System 100 may estimate the change of a footprint size (e.g., a dimension length of a feature of an object in the image) by comparing image data of the two sequential images. The second channel of information may be referred to as a "structural" or "optical flow information" channel. System 100 may perform an analysis based on the structural or optical flow information. For example, system 100 may process two or more images (e.g., sequentially acquired images or frames) to obtain an optical flow field. The optical flow field may provide information regarding the movement of trackable textures between the two or more images or frames. The analysis of the optical flow field may indicate a low time-to-collision upright object in the images. The two analyses may also be referred to as two modalities, methods, or models.

In some embodiments, the structure (or optical flow) based analysis may serve to validate a result of a texture based analysis. For example, the texture based analysis may be performed on a plurality of images (e.g., at least two images), and the structure based analysis may be performed based on the same two or more images used in the texture based analysis after the texture based analysis is performed. In such embodiments, the structure based analysis may validate a result of the texture based analysis. In some embodiments, the texture based analysis may be performed after the structure based analysis has been performed, and may validate a result of the structure based analysis.

In some embodiments, the texture based analysis may use a first group of at least two images, and the structure based analysis may use a second group of at least two images. The first group and the second group may be the same or different. In some embodiments, the first group of at least two images may be selected from odd numbered images among a plurality of images acquired by at least one of image capture devices 122-126, and the second group of at least two images may be selected from even numbered images among the same plurality of images acquired by at least of image capture devices 122-126.

In some embodiments, the first group of at least two images may be selected from a plurality of images that are acquired at a first time interval and the second group of at least two images may be selected from the same plurality of images that are acquired at a second time interval, which may be different born the first time interval, in some embodiments, a first image capture device (or a first image sensor) may be designated for capturing images for the texture based analysis, and a second image capture device (or a second image sensor) may be designated for capturing images for structure based analysis.

The texture based analysis and the structure based analysis may complement each other, and the combination of their results that may be used by processing unit 110 to make a braking decision. For example, the texture based analysis may result in a first estimate of time-to-collision, and the structure based analysis may also result in a second estimate of the time-to-collision. Processing unit 110 may cause braking system 230 to brake vehicle 200 when the difference between the first and second estimates is smaller than a threshold. One of the texture based analysis and the structure based analysis may provide a redundancy for the other, thereby improve accuracy of braking, for example, autonomous braking in emergency driving situation, by preventing or reducing the occurrence of false braking.

In some embodiments, when the structure based analysis serves as a validator of the texture based analysis, the texture based analysis may detect an object (e.g., a car or a pedestrian) in front of vehicle 200, and may determine that the time-to-collision is low (e.g., lower than a predetermined threshold). The texture based analysis may reach this determination by calculating the time-to-collision based on a change of a footprint size through time in at least two sequentially acquired images. This determination from the texture based analysis may then trigger the structure based analysis, in some embodiments, a determination that the time-to-collision is low from the texture based analysis may serve as a precondition for releasing a braking decision (e.g., an autonomous emergency braking decision) to vehicle systems. In some embodiments, braking (e.g., autonomous emergency braking) may not be performed until the structure based analysis confirms the determination made via the texture based analysis.

In some embodiments, system 100 may require that the estimated time-to-collision (TTC) determined by the structure based analysis is identical to or substantially identical to (up to an error tolerance) to the estimated time-to-collision (TTC) determined by the texture based analysis. For example, as discussed below, processing unit 10 may determine that a difference between the two TTCs determined by the texture based analysis and the structure based analysis does not exceed a predetermined threshold, which may be the error tolerance. In some embodiments, system 100 may take into account the divergence of the object's focus of expansion from that of the static environment. If the focus of expansion of the object diverges (e.g., moves) away from the focus of expansion of the static environment, this may be a strong indication that the object is a low TTC upright object. An example is discussed in greater detail with respect to FIGS. 15A and 15B. This requirement is optional because it may only apply in the case where the target object has a velocity component that is perpendicular to the driving direction of vehicle 200 (e.g., target object traveling in a direction that is not parallel to the driving direction of vehicle 200).

In some embodiments, processing unit 110 may use certain criteria for deciding whether structure based analysis supports texture based analysis in making a braking autonomous emergency braking decision. For example, such criteria may include a requirement that the optical flow fits a model of low time-to-collision upright object (LTU object), and not an open-road (or an open road surface).

Figure 8:
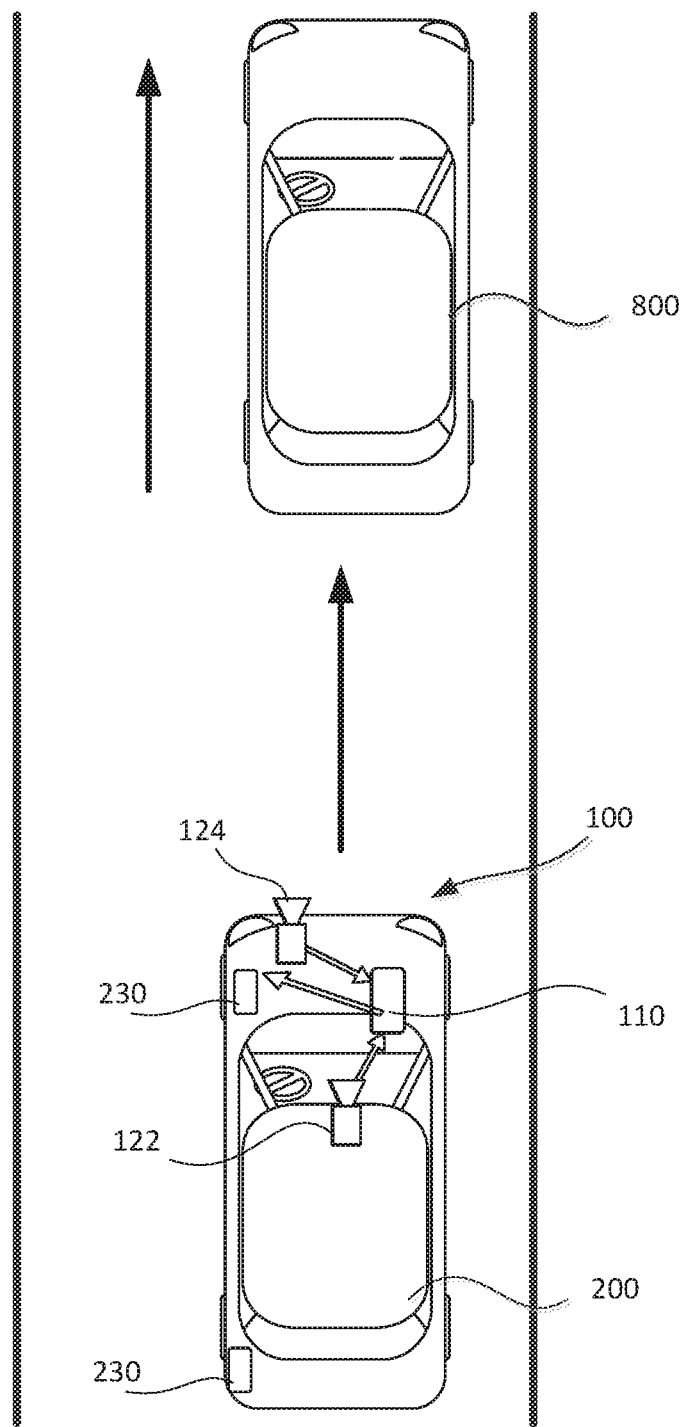
FIG. 8 is a diagrammatic representation of an exemplary vehicle including an object detecting and braking system traveling on a road behind another vehicle consistent with the disclosed embodiments.

FIG. 8 is a diagrammatic representation of an exemplary vehicle 200 including an object detecting and braking system (or referred to as an emergency braking decisioning system). The object detecting and braking system may include system 100 and braking system 230. The object detecting and braking system may also include at least one of image capture devices 122 and 124 (and 126, which is not shown in FIG. 8). The object detecting and braking system may include processing unit 110, which may be part of system 100. At least one of image capture devices 122 and 124 may acquire one or a plurality of images of an area including an object in front of vehicle 200. The object may be another vehicle, such as a vehicle 800 that may be traveling in front of vehicle 200. As shown in FIG. 8, in some embodiments, vehicle 800 may be traveling in a direction that is parallel to a traveling direction of vehicle 200. A parallel direction may include a situation in which vehicle 800 is traveling in the same direction as and in alignment or substantially in alignment with vehicle 200 (e.g., vehicle 800 traveling in front of vehicle 200), as shown in FIG. 8. A parallel direction may also include a situation in which vehicle 800 is traveling in an opposite direction relative to vehicle 200 and in alignment with vehicle 200 (e.g., vehicle 800 moving toward vehicle 200 in a direction that is 180 degrees, or substantially 180 degrees, opposite to the traveling direction of vehicle 200). A parallel direction may also include a situation in which vehicle 800 is not traveling in alignment with vehicle 200, but is traveling in a direction parallel to the traveling direction of vehicle 200 (e.g., vehicle 800 traveling on a font side of vehicle 200 at an offset distance).

In some embodiments, the object may be a pedestrian who may be standing in the road, or walking or running across the road. The area included in the images may include other objects, such as a road surface, a house, a wall, a sign, etc., which may form a static environment. When an object is not traveling in a direction parallel to the traveling direction of vehicle 200, the traveling direction of the object may transverse the traveling direction of vehicle 200 with an angle that is neither zero (or substantially zero) nor 180 degrees (or substantially 180 degrees). The images may include both moving and/or static objects.

Processing unit 110 may communicate with braking system 230 and at least one of image capture devices 122 and 124. For example, processing unit 110 may receive images from at least one of image capture devices 122 and 124, and may process the images using various methods or modalities to detect one or more times-to-collision of vehicle 200 with object 800. Although two image capture devices 122 and 124 are shown in FIG. 8, the use of additional image capture devices (e.g., 3, 4, 5, etc., image capture devices) is consistent with the disclosed embodiments.

Figure 9:
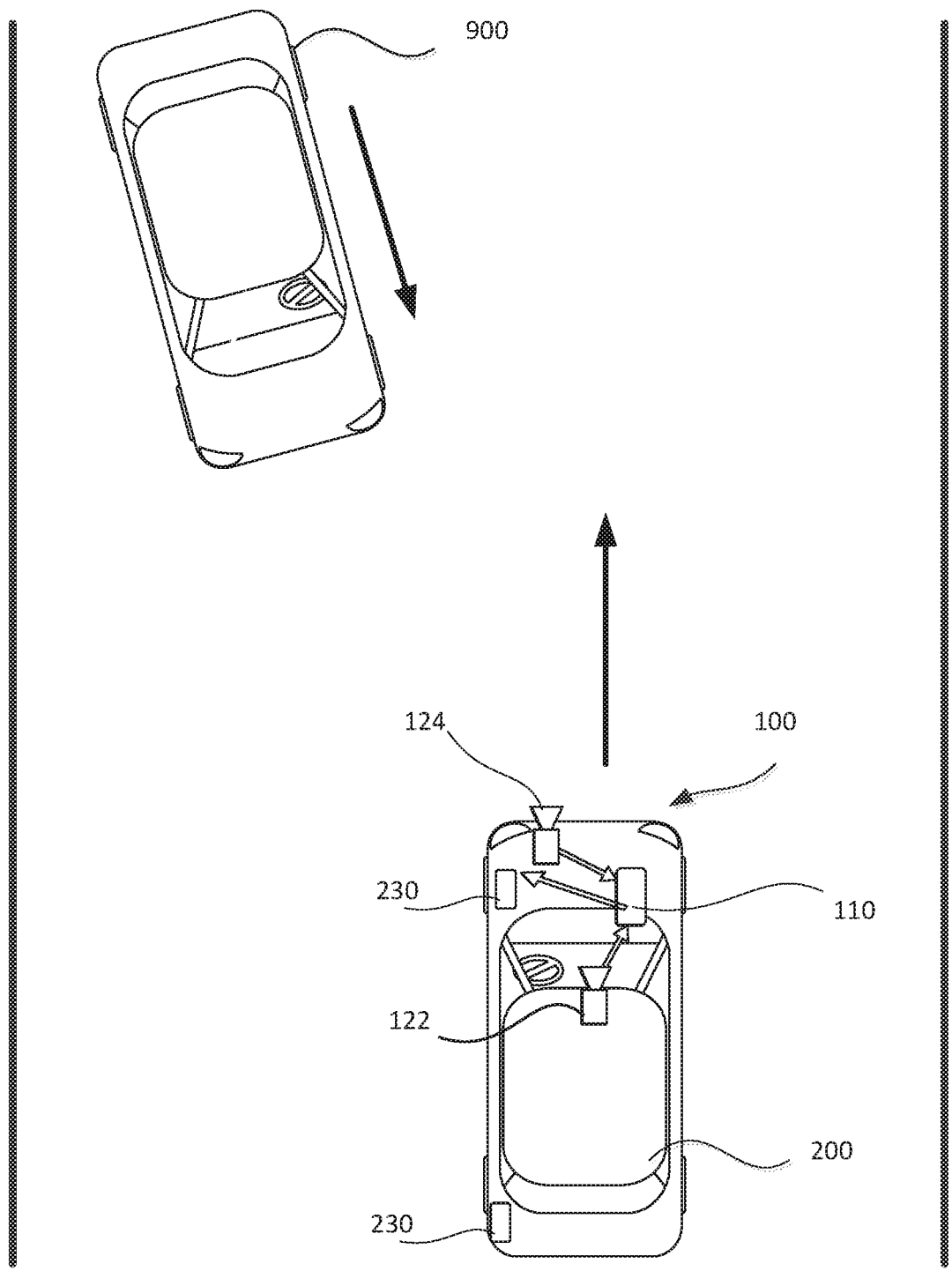
FIG. 9 is a diagrammatic representation of an exemplary vehicle including an object detecting and braking system traveling on a road including an oncoming vehicle consistent with the disclosed embodiments.

FIG. 9 is a diagrammatic representation of an exemplary vehicle 200 including an object detecting and braking system that may be configured to detect an object not traveling in a direction parallel to the traveling direction of vehicle 200. The object may be a vehicle 900 or a pedestrian (not shown). The object detecting and braking system may detect vehicle 900 traveling toward vehicle 200 based on one or more images acquired by at least one of image capture devices 122 and 124. In addition, the object detecting and braking system may determine at least two times-to-collision of vehicle 200 with vehicle 900 based on the at least one or more images. When a difference between the at least two times-to-collision does not exceed the predetermined threshold, processing unit 110 may cause vehicle 200 to brake in order to prevent collision with vehicle 900.

Figure 10:
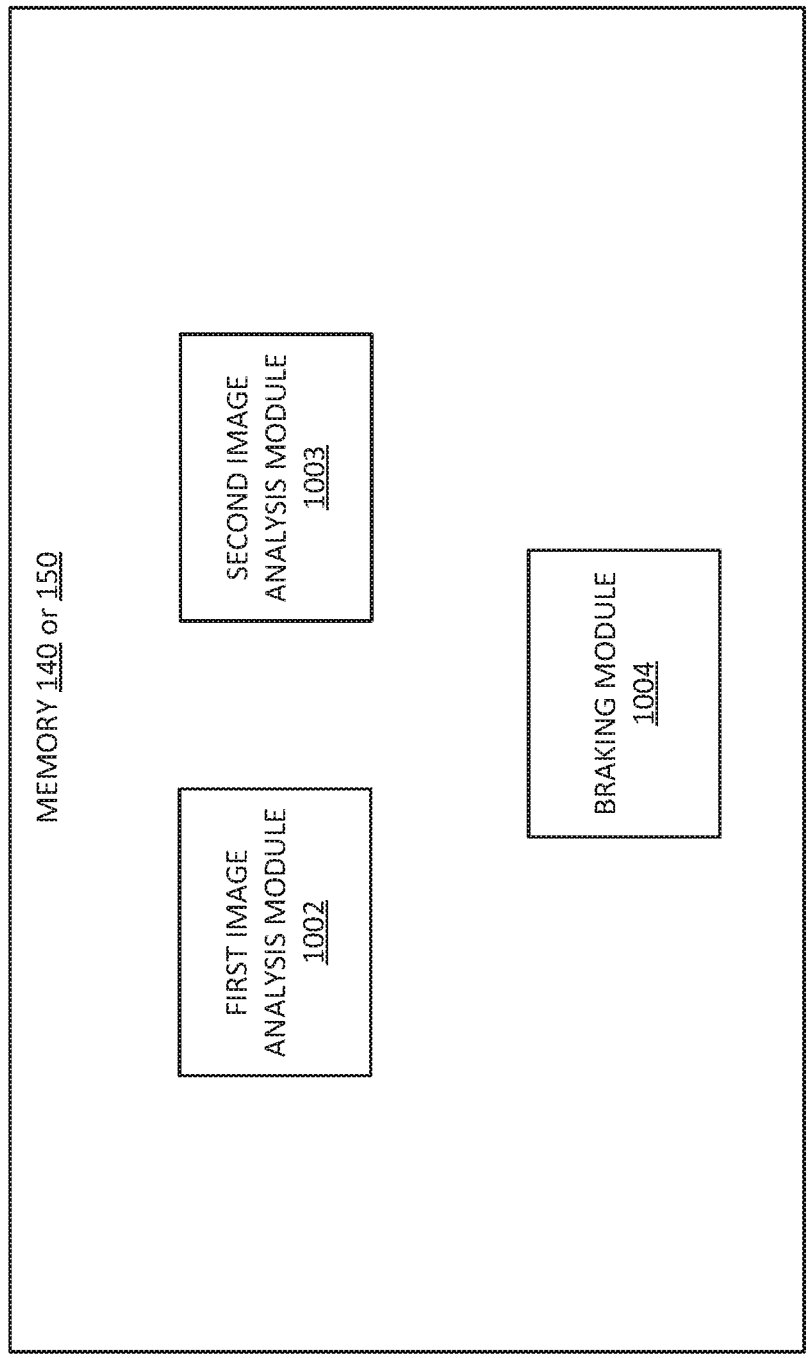
FIG. 10 is an exemplary block diagram of a memory that may store instructions for performing one or more operations for detecting an object in front of the vehicle and causing the vehicle to brake based on the detection consistent with the disclosed embodiments.

FIG. 10 is an exemplary block diagram of memory 140 or 150 that may store instructions for performing one or more operations for detecting an object in front of vehicle 200 and causing vehicle 200 to brake based on the detection. As shown in FIG. 10, memory 140 or 150 may store one or more modules for performing the operations, as described herein. For example, memory 140 or 150 may store a first image analysis module 1002, a second image analysis module 1003, and a braking module 1004. Application processor 180 and/or image processor 190 may execute the instructions stored in any of modules 1002-1004 included in memory 140 or 150: One of skill in the art will understand that references in the following discussions to processing unit 110 may refer to application processor 180 and image processor 190 individually or collectively. Accordingly, steps of any of the following processes may be performed by one or more processing devices.

First image analysis module 1002 may store instructions which, when executed by processing unit 110, may perform a first image analysis to calculate or generate a first estimated time-to-collision (TTC1) of vehicle 200 with an object (e.g., vehicle 800 or 900). First image analysis module 1002 may process at least two images acquired by at least one of image capture devices 122 and 124 using, for example, an appearance based detection method, which may calculate TTC1 based on a change in the appearance (e.g., a size) of the object in the at least two images. An exemplary first image analysis is discussed below in greater detail with respect to FIG. 12.

Second image analysis module 1002 may store instructions which, when executed by processing unit 110, may perform a second image analysis to calculate or generate a second estimated time-to-collision (TTC2) of vehicle 200 with the object (e.g., vehicle 800 or 900). Second image analysis module 1003 may process at least two images acquired by at least one of image capture devices 122 and 124 using, for example, an optical flow based method, which may calculate TTC2 based on optical flow information derived from the at least two images. An exemplary second image analysis is discussed below in greater detail with respect to FIG. 13.

Braking module 1004 may store instructions which, when executed by processing unit 110, may cause vehicle 200 to brake using braking system 230. For example, when processing unit 110 determines that a difference between TTC1 aid TTC2 does not exceed the predetermined threshold, braking module 1004 may cause braking system 230 to apply braking to reduce the speed of vehicle 200 or stop vehicle 200, thereby preventing collision with the object.

Figure 11:
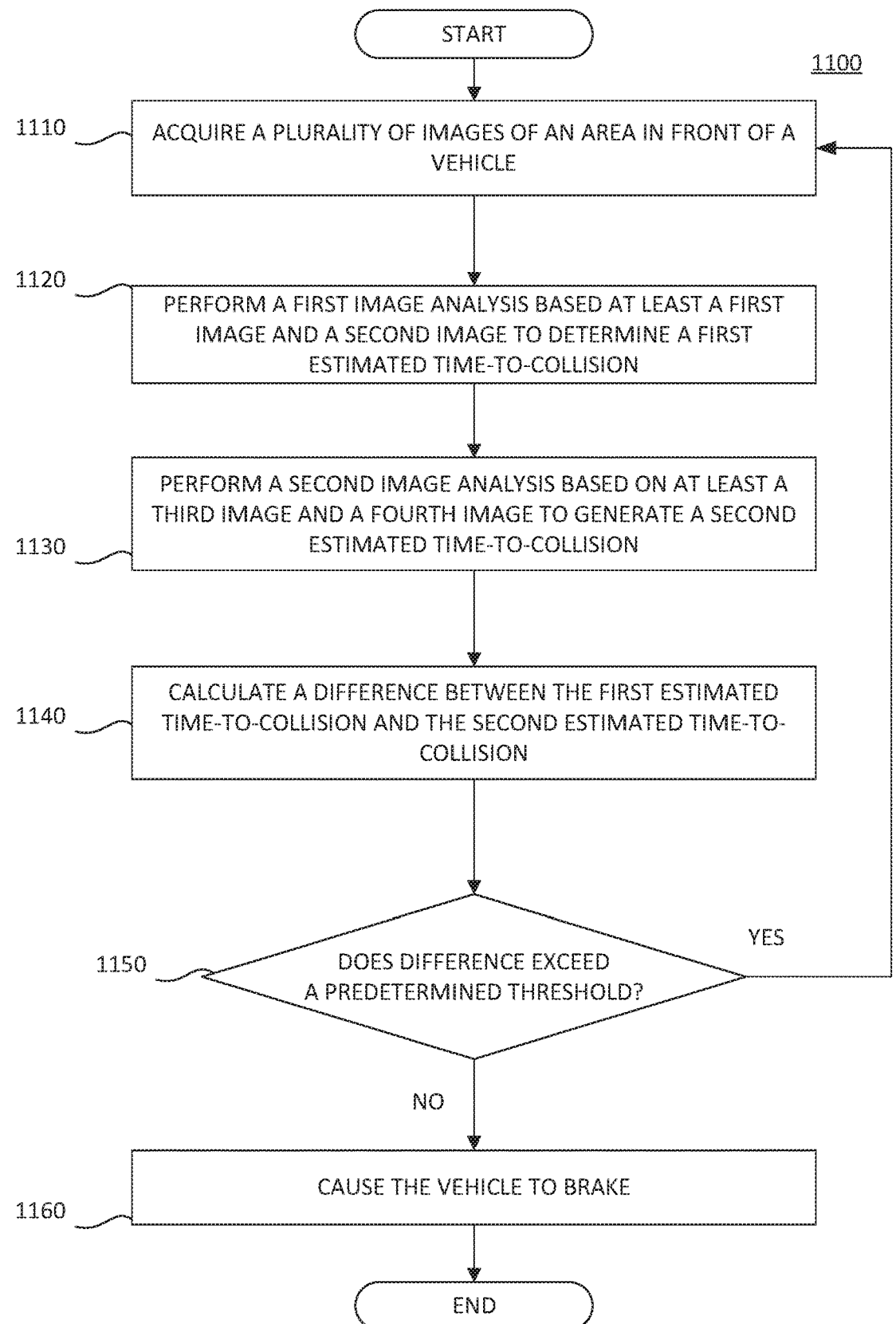
FIG. 11 is a flowchart showing an exemplary process for detecting an object in front of the vehicle and causing the vehicle to brake based on the detection consistent with the disclosed embodiments.

FIG. 11 is a flowchart showing an exemplary process or method 1100 for detecting an object in front of vehicle 200 and causing vehicle 200 to brake based on the detection. Method 1100 may include acquiring a plurality of images of an area in front of vehicle 200 (step 1110). For example, at least one of image capture devices 122 and 124 may acquire one or more images of an area in front of vehicle 200. The area may include an object, such as another vehicle or a pedestrian. The area may include other static objects, such as a sign, a house, a mountain, a road surface, etc., which may form a static environment.

Method 1100 may include performing the first image analysis based on at least a first image and a second image to generate a first time-to-collision (TTC1) (step 1120). For example, processing unit 110 may perform the first image analysis based on at least the first image and the second image. More than two images may be used in the first image analysis to generate TTC1. In some embodiments, the first image analysis may include an appearance based detection method. The appearance based detection may detect TTC1 based on a change in appearance (e.g., a change in size) of an object in the first image and the second image. The appearance based detection technique is further discussed below in connection with FIG. 12.

Figure 12:
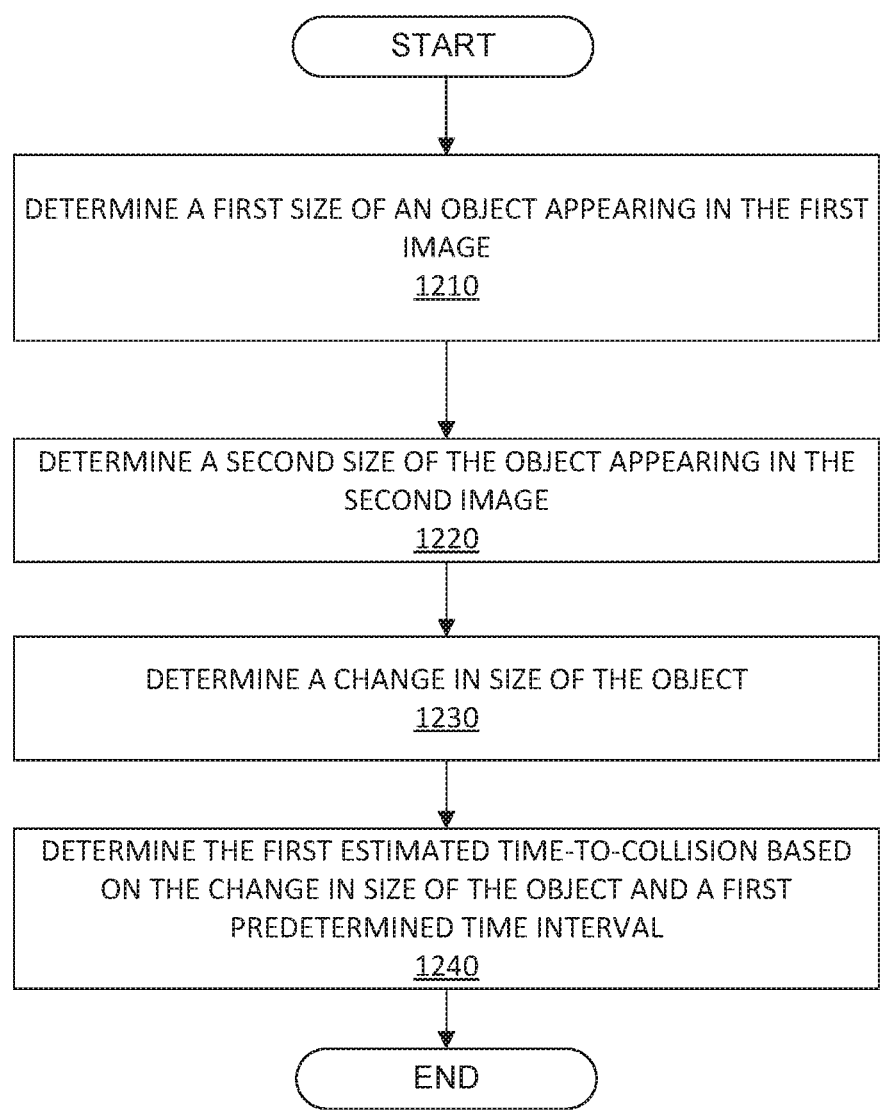
FIG. 12 is a flowchart showing an exemplary first image analysis for determining a first estimated time-to-collision consistent with the disclosed embodiments.

FIG. 12 is a flowchart showing an exemplary first image analysis 1200 for determining the first estimated time-to-collision (TTC1). The first image analysis 1200 may include the appearance or texture based detection method (hence, the first image analysis may be referred to as the texture based analysis or textural analysis). The appearance based detection method may include determining a change in the appearance of an object or a feature of the object in at least two images (e.g., the first image and the second image), and may calculate TTC1 based on the change in the appearance. In some embodiments, the change in the appearance may be a change in a size of the object (or the feature of the object).

In the exemplary first image analysis 1200 shown in FIG. 12, processing unit 110 may determine a first size of an object (or a feature of the object) appearing in the first image (step 1210). Processing unit 110 may determine a second size of the object (or the feature of the object) appearing in the second image (step 1220). The second size may be larger than the first size as vehicle 200 approaches the object. Processing unit 110 may determine the first size and the second size based on the dimensions (e.g., pixel sizes) of the object appearing in the first image and the second image. Processing unit 110 may determine a change in size (or relative scale) of the object (or the feature of the object) (step 1230). For example, processing unit 110 may subtract the first size from the second size to determine a difference in size. In some embodiments, processing unit 110 may divide the difference in size her the first size to determine a relative difference in size. The change in size (or relative scale) may refer to the relative difference in size, which may be a percentage. Processing unit 110 may determine TTC1 based on the change in size and a first predetermined time interval between times of acquisition of the first image and the second image (step 1240). The first predetermined time interval may depend on settings of the camera (e.g., the camera included in the first image capture device 122) that acquires the first image and the second image, and may be known once the camera settings are fixed. The first predetermined time interval may be any suitable interval, such as, for example, 0.05 second, 0.1 second, 0.2 second, etc. For example, the first predetermined time interval may be represented by dt1, the relative change in size may be represented by S0, and processing unit 110 may calculate TTC1 from TTC1=dt1/S0.

Referring back to FIG. 11, method 1100 may include performing a second image analysis based on at least a third image and a fourth image to generate a second estimated time-to-collision (TTC2) (step 1130). For example, processing unit 110 may derive optical flow information from the third image and the fourth image, and may calculate TTC2 based on the optical flow information. The second image analysis may be referred to as the structure based analysis or structural analysis. In some embodiments, more than two images may be used in the second image analysis to derive the optical flow information.

Figure 13:
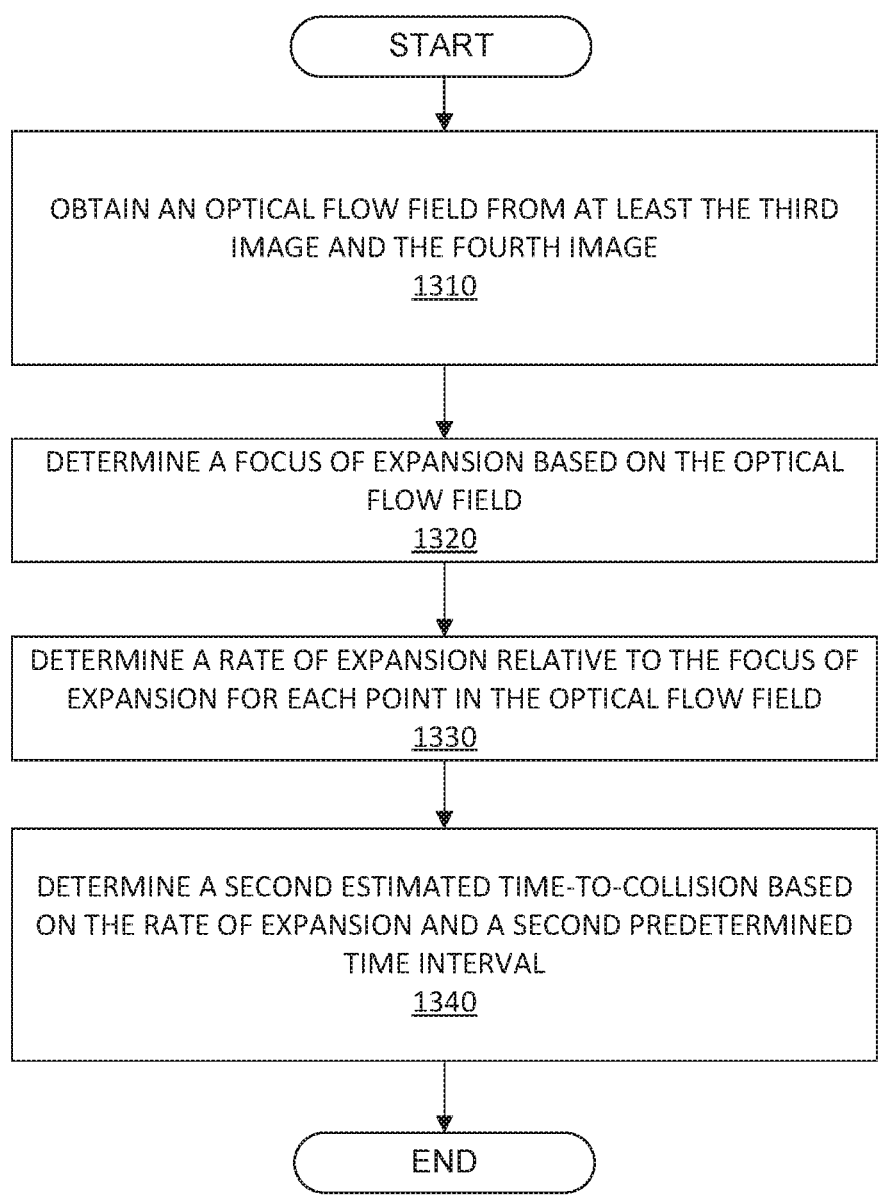
FIG. 13 is a flowchart showing an exemplary second image analysis for determining a second estimated time-to-collision consistent with the disclosed embodiments.

FIG. 13 is a flowchart showing an exemplary second image analysis 1300 for determining the second estimated time-to-collision (TTC2). The second image analysis 1300 may include obtaining or deriving an optical flow field from at least the third image and the fourth image (step 1310). In some embodiments, processing unit 110 may derive the optical flow field from the third image and the fourth image, and/or additional images acquired by at least one of image capture devices 122 and 124. The optical flow field may be a vector field in which each point may be represented by a vector showing a magnitude and a direction of movement from a first point in, e.g., the third image, to a corresponding second point in, e.g., the fourth image.

As shown in FIG. 3, the second image analysis 1300 may include determining a focus of expansion based on the optical flow field (step 1320). The focus of expansion may be a converging point of vectors in the optical flow field, which is discussed below in greater detail with respect to FIG. 16. The second image analysis 1300 may also include determining a rate of expansion relative to the focus of expansion for each point in the optical flow field (step 1330). For example, for each point in the optical flow field, processing unit 110 may calculate the rate of expansion based on a magnitude of movement of the point, and a distance from the point to the focus of expansion. For example, the magnitude of movement of any point may be represented by d, the distance from the point to the focus of expansion may be ire presented by r, and processing unit 110 may calculate the rate of expansion from $R_{exp}$=d/r. For each point in the optical flow field, the magnitude of movement r may be calculated from the magnitude of the vector associated with that point. The magnitude of movement r may indicate how much a first point in, e.g., the third image, has moved to reach a second point in, e.g., the fourth image.

As shown in FIG. 13, the second image analysis 1300 may include determining the second estimated time-to-collision (TTC2) used on the rate of expansion and a second predetermined time interval. The second predetermined time interval may be the difference between times of acquisition of the third image and the fourth image. The second predetermined time interval dt2 may depend on the settings (e.g., the frame rate) of the camera, and may or may not be the same as the first predetermined time interval used in the first image analysis. The second predetermined time interval may be any suitable interval, such as, for example, 0.05 second, 0.1 second, 0.2 second, etc. In some embodiments, TTC2 may be inversely proportional to the rate of expansion d/r, and may be directly proportional to the second predetermined time interval dt2. For example, processing unit 110 may calculate TTC2 from TTC2=dt2/(d/r).

The first image analysis 1200 and second image analysis 1300 shown in FIGS. 12 and 13 may be performed independently and separately. The first image and second image used in the first image analysis 1200 may be the same as or different from the third image and fourth image used in the second image analysis 1300, in some embodiments, the first image may be the same as the third image, and the second image may be the same as the fourth image. In some embodiments, the first image may be different from the third image, and the second image may be different from the fourth image. In some embodiments, images of alternating sequences may be used for the first and second analyses. For example, from the same set of images, odd numbered images may be used for the first image analysis, and even numbered images may be used for the second image analysis. In some embodiments, at least one image capture device (e.g., image capture device 122) may be configured to capture images (e.g., the first and second images) for use in the first image analysis to generate the first estimated time-to-collision. At least one other image capture device (e.g., image capture device 124) may be configured to capture images (e.g., the third and fourth images) for use in the second image analysis to generate the second estimated time-to-collision. In some embodiments, when at least one image capture device is used for capturing a plurality of images for the first image analysis and the second image analysis, the at least one image capture device may include a first image sensor configured to capture images (e.g., the first and second images) for use in the first image analysis, and a second image sensor that is separate and independent of the first image sensor configured to capture images (e.g., the third and fourth images) use in the second image analysis.

Referring back to FIG. 11, method 1100 may include calculating a difference between the first estimated time-to-collision (TTC1) and the second estimated time-to-collision. (TTC2) (step 1140). In some embodiments, processing unit 110 may subtract TTC1 from TTC2 to result in a difference. Processing unit 110 may determine whether the difference exceed a predetermined threshold (step 1150). The predetermined threshold may be any suitable threshold, such as, for example, 0.05 second, 0.1 second, 0.2 second, etc. When processing unit 110 determines that the difference exceeds the predetermined threshold (Yes, step 1150), processing unit 110 may repeat steps 1110-1150. When processing unit 110 determines that the difference does not exceed the predetermined threshold (No, step 1150), processing unit 110 may cause vehicle 200 to brake using, braking system 230 (step 1160).

FIGS. 14A-14C show an image with an optical flow field and a distribution of the second estimated time-to-collision (TTC2) in the optical flow field. FIG. 14A Shows an image 1400 showing a vehicle 1410 traveling on a road 1420. For illustrative purposes, other objects included in image 1400 are not shown. FIG. 14B shows an optical flow field 1430 derived based on at least two images. For example, optical flow field 1430 may be derived from image 1400 and at least one second image (not shown) of vehicle 1410 acquired at the second predetermined time interval dt2 apart from the time when image 1400 was acquired. A plurality of image points may be selected in the image 1400 or the at least one second image, and vectors connecting the corresponding points of these images may be generated by processing unit 110. The vectors may form optical flow field 1430, which is schematically shown in FIG. 14B, as a region surrounding vehicle 1410.

Although optical flow field 1430 is shown within a region surrounding vehicle 1410 for illustrative purposes, optical flow field 1430 may be derived for a smaller region (e.g., focusing on the window of vehicle 1430) or a greater region (e.g., the entire area shown in image 1400). Each point in optical flow field 1430 may be associated with a vector represented in FIG. 14B by an arrow having a length and pointing at a direction. The length of the arrow may represent a magnitude of the vector. For example, the magnitude of the vector may indicate a magnitude of movement of a first point in image 1400 to a second point in the at least one second image. The direction of the arrow may indicate the direction of movement between each pair of corresponding points in these two images.

After performing the second image analysis 1300 discussed above, processing unit 110 may determine the second estimated time-to-collision (TTC2) for each point in the optical flow field 1430. FIG. 14C shows an exemplary distribution of TTC2 over the entire area shown in image 1400. As shown in FIG. 14C, points in different regions may be associated with different values of TTC2. The different patterns and/or shades shown in FIG. 14C are shown to schematically illustrate different values of TTC2. For a region 1440 substantially focusing on the body of vehicle 1410, all or most of the points within region 1440 may be associated with substantially the same value of TTC2. In other words, for an upright moving object like vehicle 1410, all or most of the points on that upright object may have the same or substantially the same times-to-collision.

For road surfaces, however, all or most of the points may not have the same or substantially the same times-to-collision. For example, points in a first portion 1450 of road 1420 may be associated with one time-to-collision, and points in a second portion 1460 of road 1420 may be associated with another time-to-collision. These times-to-collision may be different, as shown with different patterns/shades FIG. 14C. In some embodiments, there may be a discontinuity between the times-to-collision for the first portion 1450 and second portion. 1460 of road 1420 (e.g., the changes between these times-to-collision may not be gradual). Although the first and second portions 1450 and 1460 appear as upright objects in a single image, the optical flow field generated from at least two images may reveal additional information (e.g., time-to-collision) that may distinguish a true upright object (which may or may not be moving) and a road surface, which is not upright. This aspect is farther discussed with respect to FIGS. 17A-18B.

As Shown in FIG. 14C, points in regions 1470, 1480, and 1490 may be associated with different times-to-collision, as indicated by the different patterns/shading shown in the figure. Regions 1470 and 1480 may each represent a portion of road 1420, and the change in time-to-collision values in regions 1470 and 1480 and first portion 1450 may be gradual (e.g., continuous). For example, region 1490 may present a portion of the sky, which may be associated with a time-to-collision that is different from those associated with regions 1470 and/or 1480.

Figure 15A:
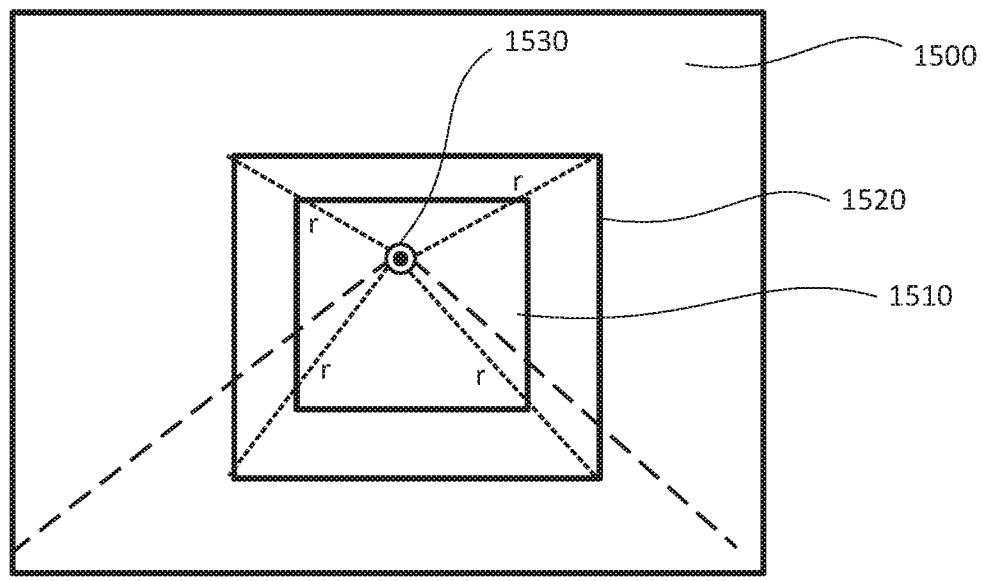
FIGS. 15A and 15B show exemplary focuses of expansion when an object travels in different directions consistent with the disclosed embodiments.
Figure 15B:
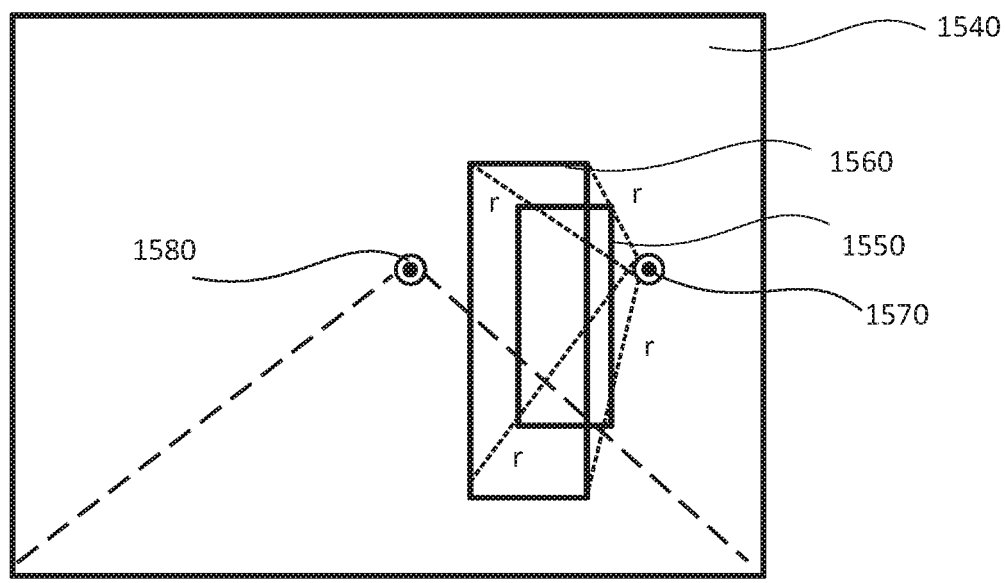

FIGS. 15A and 15B show exemplary focuses of expansion in an optical flow field. FIG. 15A shows an object in an image traveling in the same direction (or substantially the same direction) as and in alignment (or substantially in alignment) with vehicle 200 (e.g., in the same line of movement in front of vehicle 200, toward or away from vehicle 200). As shown in FIG. 15A, a focus of expansion of the object may overlap completely or substantially with a focus of expansion of the static environment. FIG. 15B shows an object not traveling in a direction parallel to the traveling direction of vehicle 200, e.g., when the object is traveling laterally in a direction that transverses the traveling direction of vehicle 200. As shown in FIG. 15B, a focus of expansion of the object may not overlap the focus of expansion of the static environment.

For example, FIG. 15A shows an environment 1500 of an area in front of vehicle 200. Consistent with disclosed embodiments, a image capture device (e.g., one of image capture devices 122-126) may acquire a first image 1510 of environment 1500 that includes an object located within the first image 1510. The area surrounding the object may represent a static environment (e.g., roads, buildings, mountains, sky, etc.). FIG. 15A also shows a second image 1520 that an image capture device (e.g., one of image capture devices 122-126) may acquire of the object after the second predetermined time interval dt2. Image 1520 may be acquired as vehicle 200 moves toward the object and, therefore, may be larger than image 1510, indicating an expansion.

FIG. 15A further shows a focus of expansion 1530. The focus of expansion 1530 may be a focus of expansion of the static environment, as indicated by two dashed lines converging to focus of expansion point 1530. The location of focus of expansion 1530 of the static environment may depend on the camera, and may not change over time as the camera continuously acquires a plurality if images of the object or area for deriving optical flow information. When the object is traveling in the same (or substantially the same) direction as and in (or substantially in) alignment with vehicle 200, e.g., in front of vehicle 200 and in the same or opposite traveling direction as vehicle 200, the focus of expansion 1530 may also constitute a focus of expansion of the object, in other words, the focus of expansion of the object traveling in the same direction as and in alignment with vehicle 200 may completely or substantially overlap (or completely or substantially converge with) the focus of expansion of the static environment. Thus, processing unit 110 may detect one focus of expansion from the optical flow field derived from a plurality of images. FIG. 15A also shows, for illustrative purpose, the distance r from certain points to the focus of expansion.

FIG. 15B shows an environment 1540 of an area in front of vehicle 200, and a first image 1550 and a second image 1560 of an object (the object being included in the first image 1550 and second image 1560) acquired by the camera one after another at the second predetermined time interval dt2. For example, as vehicle 200 moves toward the object, the image of the object may expand, e.g., from image 1550 to image 1560. FIG. 15B further shows a first focus of expansion 1570 that may be calculated from the optical flow field derived from image 1550 and image 1560 of the object. For illustrative purposes, FIG. 15B shows the distances r from certain points to the first focus of expansion 1570. FIG. 15B also shows a second focus of expansion 1580, which may be a focus of expansion of the static environment. The location of the second focus of expansion 1580 may depend on the camera, and may not change as the camera continuously acquires images of the object or area for deriving the optical flow information. In the example shown in FIG. 15B, the first focus of expansion 1570 may not overlap the second focus of expansion 1580. The detection of two or at least two non-overlapping focuses of expansion may indicate that there is at least one object in the image 1540 that is traveling laterally, e.g., in a direction that is not parallel to the traveling direction of vehicle 200, or in a direction that transverses the traveling direction of vehicle 200 at an angle that is neither zero (or substantially zero) nor 180 degrees (or substantially 180 degrees).

Figure 16:
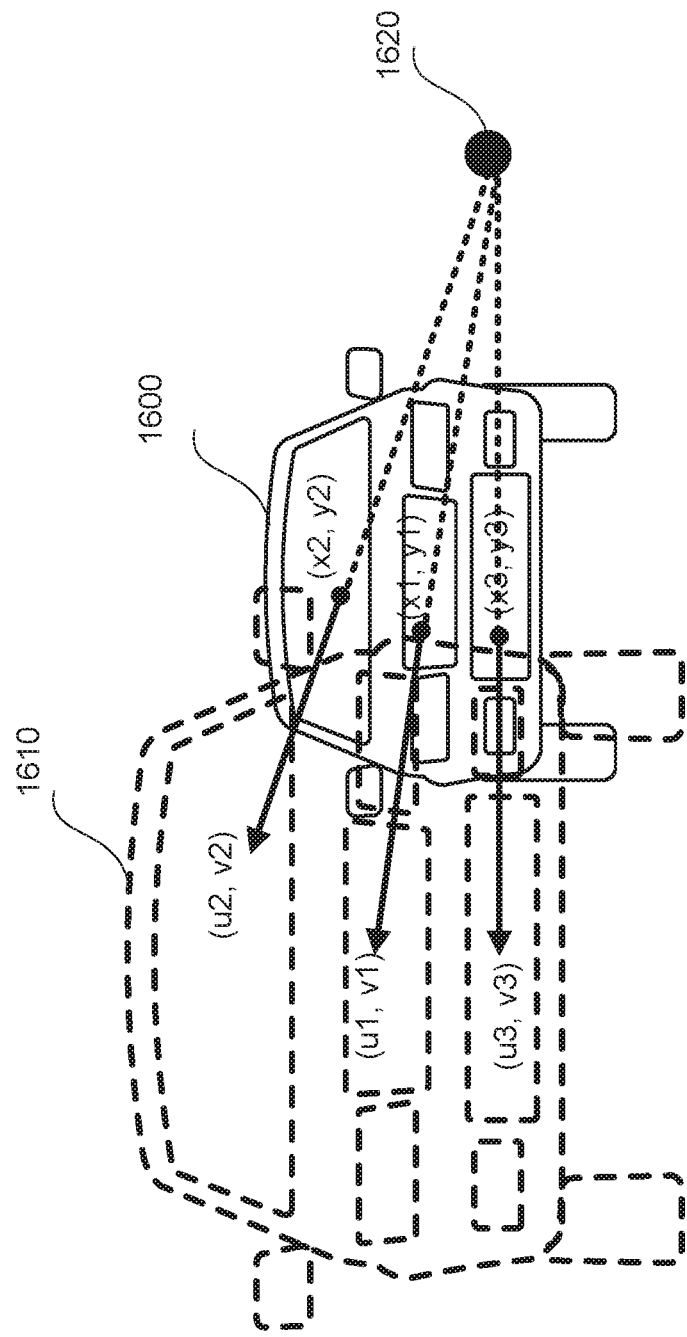
FIG. 16 shows an exemplary optical flow field and a focus of expansion consistent with the disclosed embodiments.

FIG. 16 shows an exemplary optical flow field and a focus of expansion. The following discussion of FIG. 16 illustrates how an optical flow field may be derived and how a focus of expansion may be determined. For example, vehicle 1600 is an object included in an image acquired by, e.g., image capture device 122 installed on vehicle 200, and vehicle 200 is traveling toward vehicle 1600. Image capture device 122 may sequentially and/or continuously acquire a plurality of images of an area in front of vehicle 200 as vehicle 200 approaches vehicle 1600. Any two or more images may be selected from the plurality of images to derive an optic flow field. In FIG. 16 the first image is represented by vehicle 1600 shown in solid lines, and the second image is represented by vehicle 1610 shown in dashed lines. For a plurality of selected points on the first image, e.g., points (x1, y1), (x2, y2), and (x3, y3), processing unit 110 may determine their corresponding points, e.g., (u1, v1), (u2, v2), and (u3, v3) in the second image. Vectors may be determined for each pair of points (x1, y1) and (u1, v1), (x2, y2) and (u2, v2), and (x3, y3) and (u3, v3). The vectors may indicate a magnitude and direction of expansion for the points in the first image. The length of each vector (represented by a solid arrow in FIG. 16) may indicate the distance or magnitude of movement of from one point in the first image to a corresponding point in the second image, and the direction of the vector may indicate the expansion direction or direction of movement. The converging point 1620 of the vectors may represent the focus of expansion. In some embodiments, the location if the converging point 1620 may be calculated using a suitable mathematical model based on the coordinates of the vectors. For example, the location of converging point 1620 may be calculated from:

$$SS^*(x_i - FOE_x) = u_i \quad (1)$$

$$SS^*(y_i - FOE_y) = v_i \quad (2)$$

Where SS may be a constant, $(x_i, y_i)$ may be coordinates of the i-th point within a first image, and $(u_i, v_i)$ may be coordinates of the corresponding i-th point within the second image. $FOE_x$ and $FOE_y$ may be coordinates representing the location of converging point 1620 (i.e., focus of expansion).

Figure 17B:
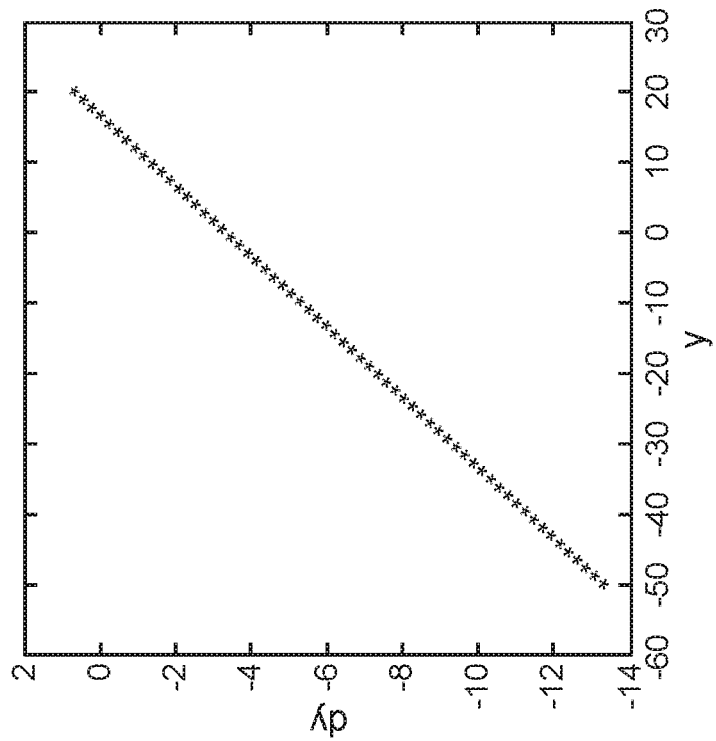
FIGS. 17A and 17B show an image of an object and a linear relationship between distances from points in an optical flow field to the focus of expansion and magnitudes of movement of the points consistent with the disclosed embodiments.
Figure 17A:
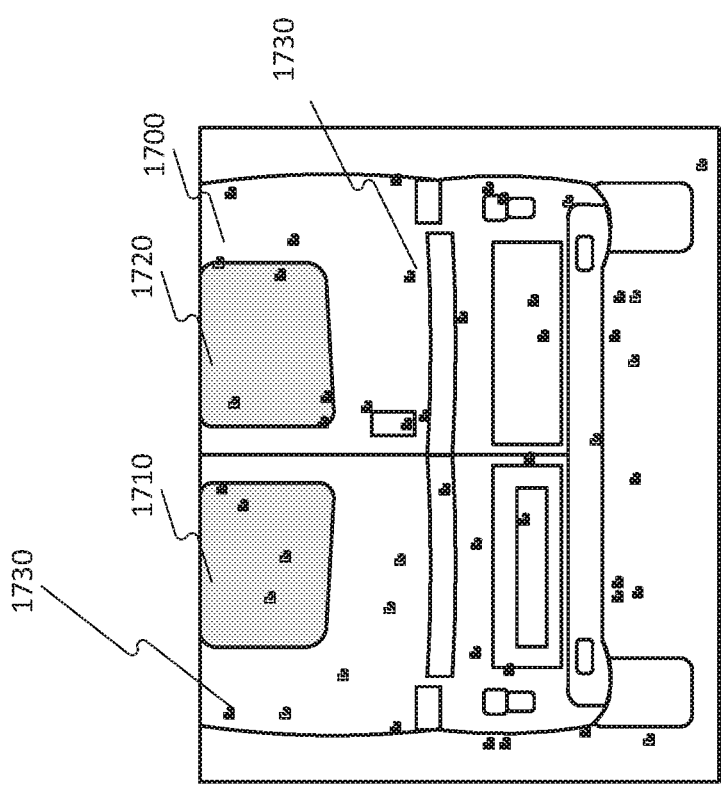

FIGS. 17A and 17B show an image of an object and a linear relationship between distances from points in an optical flow field to the focus of expansion and magnitudes of movement of the points. FIGS. 17A and 17B show that a linear relationship between distances from points to the focus of expansion and magnitudes of movement of the points may be used to determine that the object is an upright object (e.g., a low time-to-collision upright object).

FIG. 17A shows an image including an object, i.e., a vehicle 1700. The image of vehicle 1700 may include an image of two car windows 1710 and 1720, which appear to be darker in the image of vehicle 1700. A plurality of points 1730 may be selected, most of which may from a region in the image of vehicle 1700. An optical flow field may be derived from at least two images of vehicle 1700 acquired one after another with the second predetermined time interval dt2. Processing unit 110 may determine the magnitudes of movement d and the distances r from the points to the focus of expansion based on the optical flow field. Process ng unit 110 may determine a relationship between the magnitudes d and distances r. In some embodiments, the relationship may be a linear relationship, as shown in FIG. 17B, indicating that d/r (e.g., slope of the plotted line) is the same for all or substantially all of the points in the optical flow field. As discussed above, d/r may be inversely proportional to the second estimated time-to-collision (TTC2). Thus, a linear relationship between d and r may indicate a constant or substantially constant value of d/r, which in turn may indicate a constant or substantially constant TTC2 for all or substantially all of the points in the optical flow field. The constant or same TTC2 may indicate that the object within the optical flow field is an upright object, or a low time-to-collision upright object.

To illustrate the linear relationship between magnitudes of movement d and distances r, FIG. 17B shows a plot of the vertical components (y components) related to the magnitudes of movement d (e.g., the magnitude of movement in the y direction, "dy" in FIG. 17B) versus vertical components of distances r (e.g., the distance to the focus of expansion in the y direction, "y" in FIG. 17B). Although not shown in FIG. 17B, a plot of the horizontal components, e.g., magnitudes in the x direction and distances in the x direction, may also indicate a linear relationship, which in turn may indicate a constant or substantially constant time-to-collision for all or substantially all of the selected points in the optical flow field. In addition, a plot of distances r and magnitudes d may also indicate a linear relationship, which in turn may indicate a constant (or same) or substantially constant (or same) time-to-collision for all or substantially all of the selected points in the optical flow field.

Figure 18B:
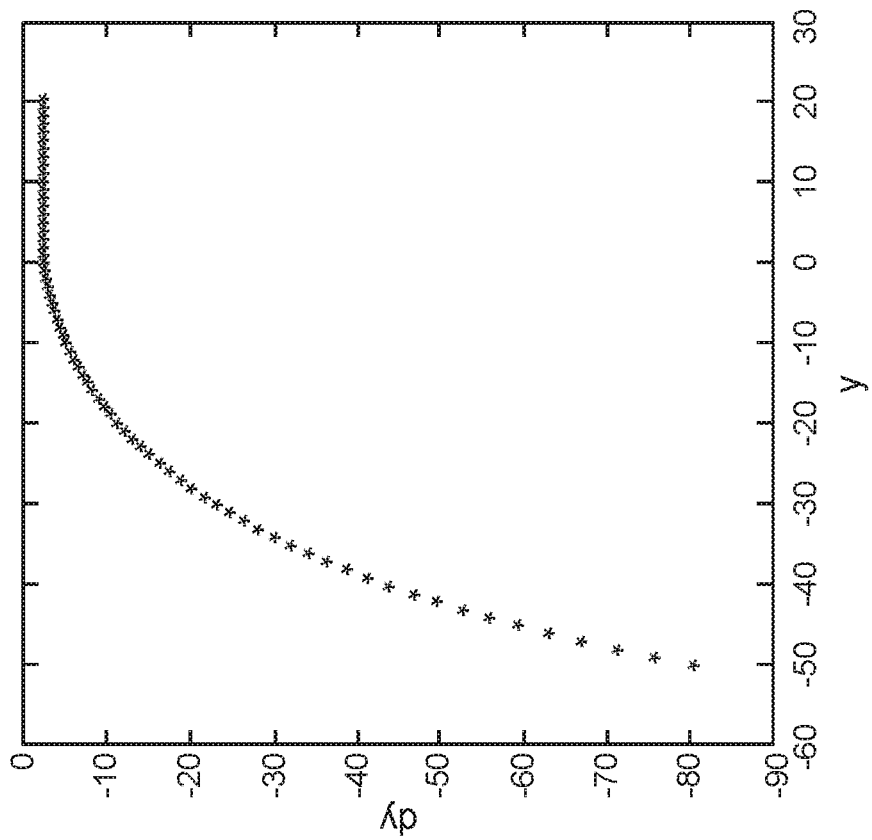
FIGS. 18A and 18B show an image of an object and a non-linear relationship between distances from points in an optical flow field to the focus of expansion and magnitudes of movement of the points consistent with the disclosed embodiments.
Figure 18A:
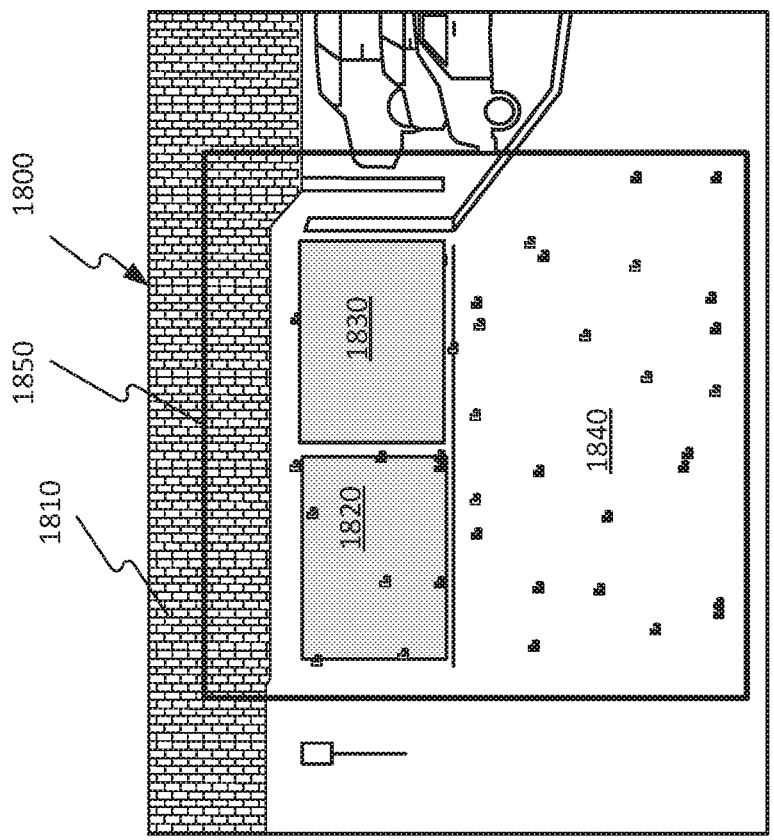

When a non-linear relationship between the magnitudes of movement d and the distances r to the focus of expansion is detected or determined, the non-linear relationship may indicate that the second estimated times-to-collision are different for different points included in the optical flow field, which in turn may indicate that the image may include a road surface, rather than an upright object. As discussed above, the second estimated times-to-collision may be determined based on the optical flow information derived from at least two images. FIGS. 18A and 18B show an image of an object and a non-linear relationship between distances r from points in an optical flow field to the focus of expansion and magnitudes d of movement of the points. FIG. 18A shows an image 1800 of a house 1810 having two garages 1820 and 1830 with garage doors opened, and a driveway 1840 (e.g., a road surface) leading up to the garages 1820 and 1830. Because the garage doors are opened, garages 1820 and 1830 may appear darker on the image, similar to the car windows 1710 and 1720 shown in FIG. 17A. A region 1850 of the image may be selected for image processing. A plurality of points may be selected within region 1850, and at least two images including regions corresponding to region 1850 may be acquired to derive an optical flow field. Based on the optical flow field having a plurality of vectors, processing unit 110 may determine a focus of expansion, the distances r of the points to the focus of expansion, and the magnitudes d of movement of the points included in the optical flow field. Processing unit 110 may determine a relationship between the distances r and the magnitudes d. In the situation shown in FIG. 18A, processing unit 110 may determine that the relationship between the distances r and the magnitudes d is non-linear. The non-linear relationship between the distances r and the magnitudes d may indicate that the times-to-collision for the points are different for different points. This in turn may indicate that selected region 1850 includes an image of a road surface, rather than an upright object like vehicle 1700 shown in FIG. 17A.

To illustrate the non-linear relationship between magnitudes of movement d and distances r, FIG. 18B shows a plot of the vertical components (y components) related to the magnitudes d of movement (e.g., the magnitude of movement in the y direction, "dy" in FIG. 18B) versus vertical components of distances r (e.g., the distance to the focus of expansion in the y direction, "y" in FIG. 18B). Although not shown in FIG. 18B, a plot of the horizontal components, e.g., magnitudes in the x direction and distances in the x direction, may also indicate a nonlinear relationship, and hence, different times-to-collision for the selected points in the optical flow field. In addition, a plot of distances r and magnitudes d may also indicate a nonlinear relationship, and hence, different times-to-collision for the selected points in the optical flow field. Here, the image in the region 1850 may appear similar to the image of vehicle 1700 shown in 17A in a single image. The optical flow field derived from a plurality of images acquired at the second predetermined time interval dt may, reveal additional information, e.g., time-to-collision information, about the objects included in the selected region. The time-to-collision information may be used to determine whether the object is an upright object or a road surface. Processing unit 110 may combine this determination with the calculated TTC2 to determine whether or not to cause vehicle 200 to brake.

Figure 19:
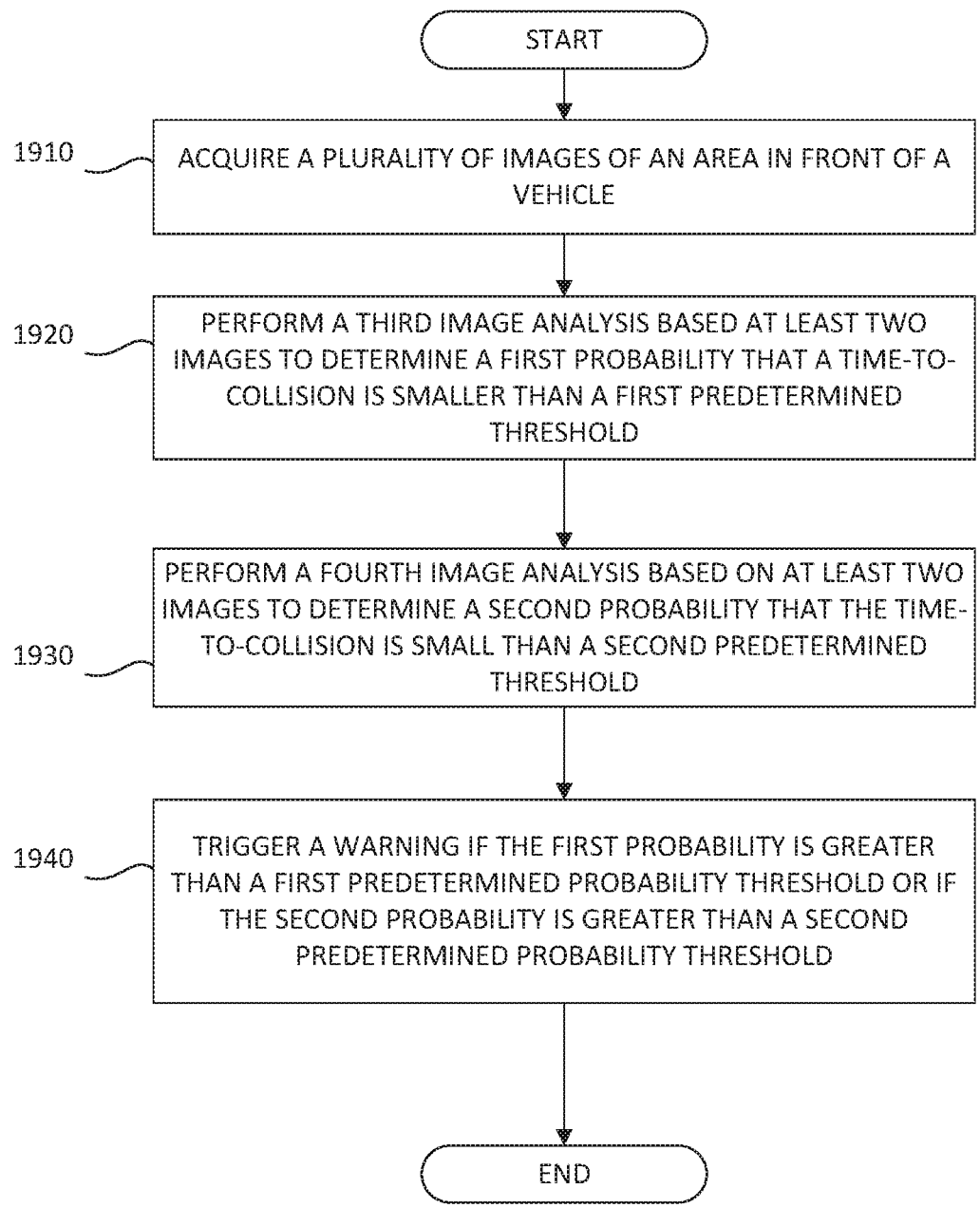
FIG. 19 is a flowchart showing an exemplary process for triggering a warning based on probabilities indicating that a time-to-collision is smaller than one or more thresholds consistent with the disclosed embodiments.

FIG. 19 is a flowchart showing an exemplary process 1900 for triggering a warning based on one or more probabilities indicating that a time-to-collision is smaller than one or more thresholds. Instead of determining the time-to-collision as discussed above, processing unit 110 may determine, based on at least two images acquired by one or more image capture devices 122, 124, and 126, a probability that the time-to-collisions smaller than a predetermined threshold. For example, in process 1900, one or more image capture devices 122-126 may acquire a plurality of images of an area in front of vehicle 200 (step 1910). In some embodiments, one image capture device having one camera may be used. In some embodiments, two or more image capture devices have two or more cameras may be used. For example, one camera may have a 45-degree field of view of the area in front of vehicle 200, and another camera may have a 30-degree field of view.

In some embodiments, processing unit 110 may perform a third image analysis based on at least two images to determine a first probability (P1) that a time-to-collision (TTC) is smaller than a first predetermined threshold T1 (i.e., TTC<T1) (step 1920). The first predetermined threshold T1 may be any suitable value, such as, for example, 0.1 second, 0.2 second, 0.5 second, etc. Processing unit 110 may determine a second probability (P2) that the time-to-collision (TTC) is smaller than a second predetermined threshold T2 (i.e., TTC<T2) (step 1930). The second predetermined threshold T2 may be any suitable value, such as, for example, 0.1 second, 0.2 second, 0.5 second, etc. The second predetermined threshold T2 may or may not be the same as the first predetermined threshold T1.

Processing unit 110 may trigger a warning if the first probability P1 is greater than a first predetermined probability threshold Tp1, or if the second probability P2 is greater than a second predetermined probability threshold Tp2. Tp1 and Tp2 may be any suitable value, such as, for example, 0.5, 0.8, 0.9, etc. Tp1 and Tp2 may or may not be the same. In some embodiments. Tp2 may be smaller than Tp1. Processing unit 110 may compare the first probability P1 with the first predetermined probability threshold Tp1 to determine whether the first probability) P1 is greater than the first predetermined probability threshold Tp1. Processing unit 110 may also compare the second probability P2 with the second predetermined probability threshold Tp2 to determine whether the second probability P2 is greater than the second predetermined probability threshold Tp2. The warning may include an audio alert, a video alert, a vibrational alert, or a combination thereof. The warning may alert the driver so that the driver may take suitable navigational action, such as applying brakes, steering the wheel, etc.

Figure 20:
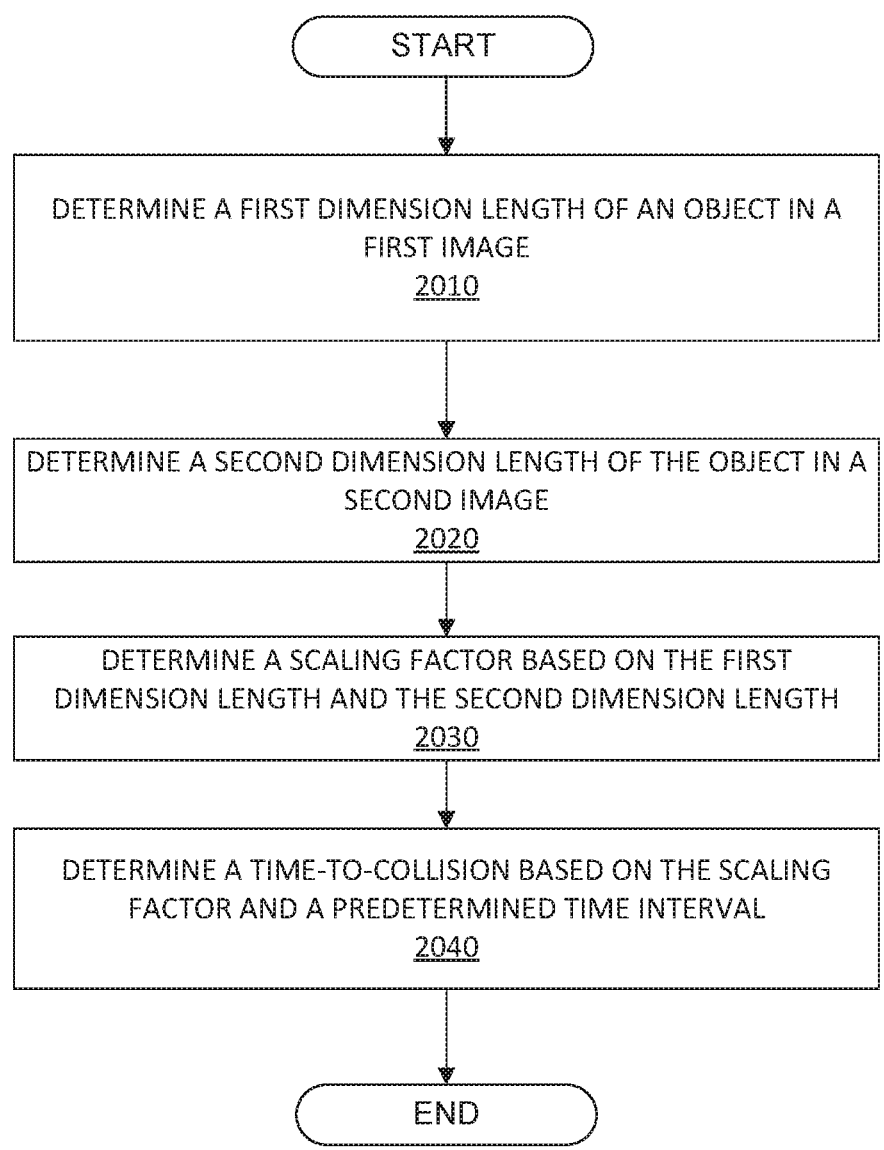
FIG. 20 is a flowchart showing an exemplary process for determining the first time-to-collision (TTC1) that may be implemented in the first image analysis shown in FIG. 11 consistent with the disclosed embodiments.

FIG. 20 is a flowchart showing an exemplary process 2000 for determining the first time-to-collision (TTC1) that may be implemented in the first image analysis shown in FIG. 11. Process 2000 may be used in the first image analysis as an alternative texture based TTC1 calculation method replacing the process 1200 shown in FIG. 12. Processing unit 110 may process at least two images that are acquired at a predetermined time interval DT. Processing unit 110 may determine a first dimension length y1 of an object in a first image (step 2010). The first dimension length of the object may be a length of a feature of the object in the vertical direction, horizontal direction, or in any direction on the first image. For example, when the object is a vehicle, the feature may be a vertical side of a license plate on the vehicle. Processing unit 110 may determine a second dimension length y2 of the same object (or the same feature of the same object) in a second image, which may be acquired after the first image at a time that is DT after the time the first image is acquired (step 2020). Processing unit 110 may determine a scaling factor Sf based on the first dimension length and the second dimension length. For example, processing unit 110 may calculate Sf based on Sf=y1/y2. In some embodiments, processing unit may track the horizontal and vertical coordinates (dx, dy) of the object in the first and second image, and may calculate Sf based on the coordinates (dx, dy), for example, Sf=dy1/dy2.

Processing unit 110 may determine a time-to-collision (which may be the first time-to-collision shown in FIG. 11) based on the scaling factor and the time interval DT. In some embodiments, processing unit 110 may calculate TTC1 from TTC1=DT/(Sf−1).

Using two, i.e., texture based and structure based, sensing modalities, methods, or models, as described above, have several benefits or advantages. For example, an immediate result of using two modalities in a braking decisioning system is a reduction of the probability system failure may be achieved, as compared to braking decisioning systems using only one of the modalities (or only one information channel).

Another benefit relates to system validation using t at least two modalities (or channels of information, or two independent and or separate analyses) enable the vehicle to assess the overall system failure rate (e.g., mean-time-between-failures or MTBF). The overall system failure rate may be determined by assessing each modality's failure rate separately (e.g., by assessing the failure rate of the texture based analysis and the failure rate of the structure based analysis separately). The two modalities may be implemented in two sub-systems: a textural analysis based sub-system and a structural analysis based sub-system. The failure rates of the two modalities may be multiplied. A result of the multiplication may be used as an indicator of or may be used to compute the overall system failure rate. In some embodiments, the MTBF may be estimated based on the result of the multiplication, even if it is significantly higher than the extent (in time) of available validation data.

For example, in one scenario, a record of only 1000 hours of data is available, and the combined systems MTBF is 1000000 hours. In 1/100 hours the texture based analysis may trigger a false braking decision, in 1/10000 of the cases the texture based analysis is checking the hypothesized decision (e.g., the hypothesized decision being a decision to brake because of a low TTC upright object in front of vehicle 200). In such cases, the texture based analysis may falsely approve the hypothesized decision. By direct assessment of the combined system (or combined analyses of the texture based analysis and the structure based analysis), vehicle systems may only achieve 0 failure over 1000 hours, and may not be able to assess the MTBF. By taking two independent channels of information into account in the braking decisioning for vehicle 200, e.g., using the texture based analysis and the structure based analysis, a vehicle system may be able to assess the failure rate of each sub-system (e.g., textural analysis based sub-system and structural analysis based sub-system) separately. Such failure rates may be multiplied, and a result of the multiplication may be used to assess the MTBF. For example, in some embodiments, the textural analysis based sub-system may be keep running alone and it may fail 10 times over 1000 hours. If the structural analysis based sub-system is falsely provoked 1000000 times, as if, for example, the textural analysis based sub-system reached a decision that there is a need to issue an autonomous emergency braking on an open road, the structural analysis based sub-system may fail once in 10000 provocations. Based on these observations, processing unit 110 may deduce (or determine) that the total system mean-time-between failures (MTBFs) is indeed 1000000 hours. This estimate may be reached using only 1000 hours of recorded data. Thus, by using the disclosed two modalities, system validation may be more efficiently performed based on only limited hours of recorded data.

Figure 21:
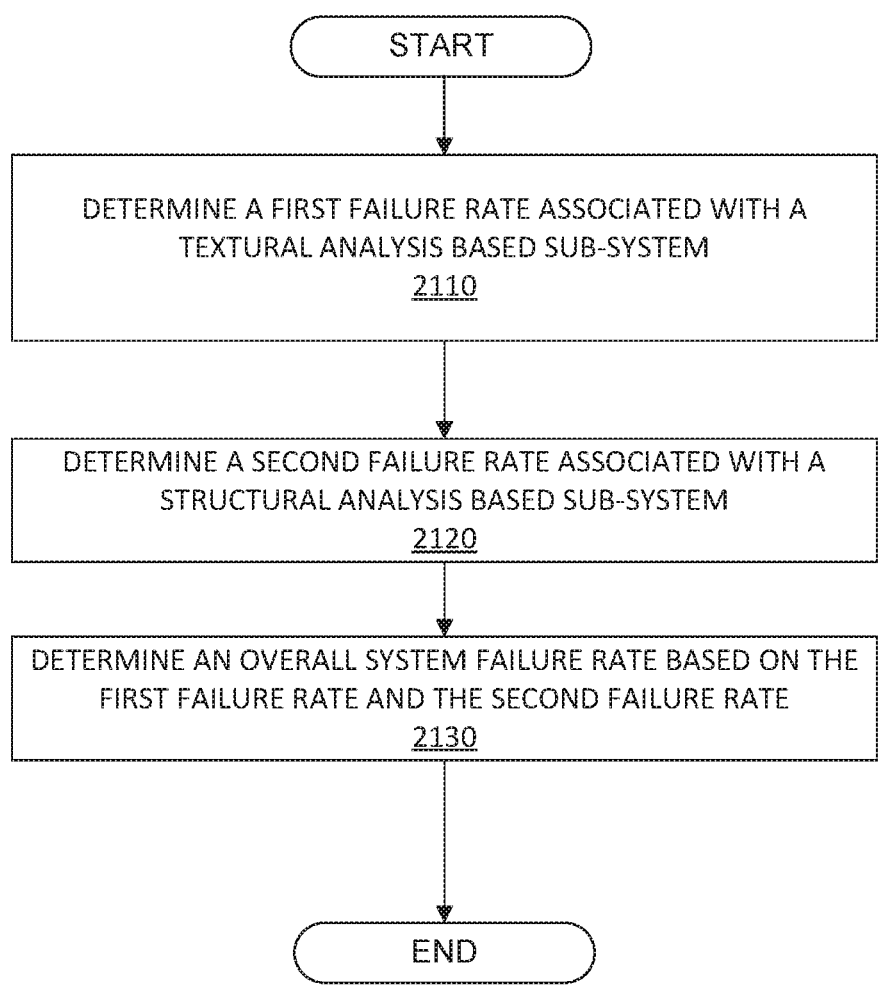
FIG. 21 is a flowchart showing an exemplary process for performing a system validation using two modalities consistent with the disclosed embodiments.

FIG. 21 is a flowchart showing an exemplary process 2100 for performing system validation using two modalities. Process 2100 summarizes the system validation discussed above. Processing unit 110 may determine a first failure rate associated with the textural analysis based sub-system (step 2110). For example, processing unit 110 may determine the first failure rate based on the total number of times the textural analysis based sub-system makes a false braking decision (e.g., falsely detected a low TTC upright object) among a total number of system running hours. As discussed above, the textural analysis based sub-system may make a decision to brake based on detection of a change in a texture (e.g., a change in footprint size) between at least two images of an area in front of vehicle 200. Processing unit 110 may determine a second failure rate associated with the structural analysis based sub-system (step 2120). For example, processing unit 110 may determine the second failure rate based on the total number of times the structural analysis based sub-system makes a false braking decision (e.g., falsely detected a low TTC upright object) among the same total number of system running hours or a different total number of system running hours. Processing unit 110 may determine an overall system failure rate based on the first failure rate and the second failure rate (step 2130). For example, processing unit 110 may multiply the first failure rate and the second failure rate, and use a result of the multiplication as an indicator of overall system mean-time-between-failures (MTBF).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, other optical drive media.

Computer programs based on the written description and disclosed methods are within the skill of an experienced developer. The various programs or program modules can be created using any of the techniques known to one skilled in the an or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for performing system validation, the method comprising:
   determining, by a processor, a first failure rate associated with a textural analysis, the textural analysis including a textural decision based on a change in texture between at least two images captured by an image sensor, wherein determining the first failure rate is based on a total number of times the textural analysis yields a false braking decision;
   determining a second failure rate associated with a structural analysis, the structural analysis including a structural decision based on optical flow information derived from the at least two images, wherein determining the second failure rate is based on a total number of times the structural analysis yields a false braking decision;
   determining an overall system failure rate based on the first failure rate and the second failure rate, wherein determining the overall system failure rate includes multiplication of the first failure rate and the second failure rate; and
   causing a vehicle to brake based on the determined overall system failure rate.

2. The method of claim 1, wherein the multiplication of the first failure rate and the second failure rate results in an indicator of an overall system mean-time-between-failures (MTBF).

3. The method of claim 1, wherein determining the first failure rate is based on the total number of times the textural analysis makes the false braking decision among a total number of system running hours.

4. The method of claim 1, wherein determining the second failure rate based on the total number of times the structural analysis makes the false braking decision among a total number of system running hours.

5. The method of claim 1, wherein determining the first failure rate comprises performing, with the textural analysis, a pattern recognition over pixel intensities in the at least two images.

6. The method of claim 5, wherein performing the pattern recognition comprises estimating a change of a footprint size by comparing image data of the at least two images.

7. The method of claim 6, wherein the footprint size comprises a dimension length of a feature of an object in the at least two images.

8. The method of claim 1, wherein determining the second failure rate comprises processing the at least two images with the structural analysis to obtain an optical flow field.

9. The method of claim 1, wherein the optical flow information provides information regarding a movement of trackable textures between the at least two images.

10. The method of claim 1, wherein determining the second failure rate is performed after determining the first failure rate.

11. A validation system, the system comprising:
    at least one processor configured to;
    determine a first failure rate associated with a textural analysis, the textural analysis including a textural decision based on a change in texture between at least two images captured by an image sensor, wherein determining the first failure rate is based on a total number of times the textural analysis yields a false braking decision;
    determine a second failure rate associated with a structural analysis, the structural analysis including a structural decision based on optical flow information derived from the at least two images, wherein determining the second failure rate is based on a total number of times the structural analysis yields a false braking decision;
    determine an overall system failure rate based on the first failure rate and the second failure rate, wherein determining the overall system failure rate includes multiplication of the first failure rate and the second failure rate; and
    cause a vehicle to brake based on the determined overall system failure rate.

12. The system of claim 11, wherein the multiplication of the first failure rate and the second failure rate results in an indicator of an overall system mean-time-between-failures (MTBF).

13. The system of claim 11, wherein determining the first failure rate is based on the total number of times the textural analysis makes the false braking decision among a total number of system running hours.

14. The system of claim 11, wherein determining the second failure rate based on the total number of times the structural analysis makes the false braking decision among a total number of system running hours.

15. The system of claim 11, wherein determining the first failure rate comprises performing, with the textural analysis, a pattern recognition over pixel intensities in each of the at least two images.

16. The system of claim 15, wherein performing the pattern recognition comprises estimating a change of a footprint size by comparing image data of the at least two images.

17. The system of claim 16, wherein the footprint size comprises a dimension length of a feature of an object in the at least two images.

18. The system of claim 11, wherein determining the second failure rate comprises processing the at least two images with the structural analysis to obtain an optical flow field.

19. The system of claim 11, wherein the optical flow information provides information regarding a movement of trackable textures between the at least two images.

\* \* \* \* \*